(12) United States Patent
Shader et al.

(10) Patent No.: US 8,275,699 B2
(45) Date of Patent: Sep. 25, 2012

(54) HONORARY CREDIT SYSTEM AND METHOD

(75) Inventors: Danny Shader, Palo Alto, CA (US); Kurt Thams, Santa Cruz, CA (US); Steve Capps, Santa Carlos, CA (US)

(73) Assignee: PayNearMe, Inc., Mountain View, CA (US)

( * ) Notice: Subject to any disclaimer, the term of this patent is extended or adjusted under 35 U.S.C. 154(b) by 301 days.

(21) Appl. No.: 12/712,990

(22) Filed: Feb. 25, 2010

(65) Prior Publication Data

US 2011/0208643 A1 Aug. 25, 2011

(51) Int. Cl.
G06Q 40/00 (2012.01)
(52) U.S. Cl. ........................................................ 705/38
(58) Field of Classification Search .................. None
See application file for complete search history.

(56) References Cited

U.S. PATENT DOCUMENTS

| | | | |
|---|---|---|---|
| 5,577,109 A | 11/1996 | Stimson et al. | |
| 5,721,768 A | 2/1998 | Stimson et al. | |
| 6,070,798 A | 6/2000 | Nethery | |
| 6,185,545 B1 | 2/2001 | Resnick et al. | |
| 6,581,827 B2 | 6/2003 | Welton | |
| 6,736,314 B2 | 5/2004 | Cooper et al. | |
| 6,745,022 B2 | 6/2004 | Knox | |
| 6,837,426 B2 | 1/2005 | Tidball et al. | |
| 6,938,013 B1 | 8/2005 | Gutierrez-Sheris | |
| 7,035,813 B1 | 4/2006 | Cook | |
| 7,042,992 B1 | 5/2006 | Falcone | |
| 7,243,839 B2 | 7/2007 | Beck et al. | |
| 7,296,003 B2 | 11/2007 | Mersky et al. | |
| 7,344,067 B2 | 3/2008 | Beck et al. | |
| 7,611,051 B1 | 11/2009 | Beck et al. | |
| 7,640,193 B2 | 12/2009 | Crespo et al. | |
| 7,711,639 B2 | 5/2010 | Reid et al. | |
| 2002/0147689 A1* | 10/2002 | Falkner | 705/52 |
| 2002/0152163 A1* | 10/2002 | Bezos et al. | 705/40 |
| 2002/0153410 A1 | 10/2002 | Santini | |
| 2002/0161644 A1 | 10/2002 | Duffield | |

(Continued)

OTHER PUBLICATIONS

"Cash payment comes to Internet retailing." accessed at <http://www.internetretailer.com/internet/marketing-conference/56525-cash-payment-come>. Jun. 18, 2009. (pp. 1-2).

(Continued)

Primary Examiner — Jason M Borlinghaus
(74) Attorney, Agent, or Firm — Peter A. Socarras; Bozicevic, Field & Francis LLP

(57) ABSTRACT

Provided in some embodiments is a method for conducting an honorary credit transaction. The method includes providing a system configured to provide honorary credit to a purchaser in exchange for an honorary commitment to provide payment for electronically transmittable item to one or more agents, wherein the honorary commitment comprises a non-legally binding commitment to provide a payment to the one or more agents for purchase of the electronically transmittable item, receiving a request from a first purchaser to provide a second purchaser honorary credit in exchange for an honorary commitment to provide payment for an electronically transmittable item to one or more agents, providing the second purchaser honorary credit in exchange for an honorary commitment to provide payment for the electronically transmittable item to one or more agents, providing the electronically transmittable item to the second purchaser via electronic transmission prior to receiving payment for the electronically transmittable item, and if a payment is received for the electronically transmittable item via at least one of the one or more agents, providing an incentive to the first purchaser.

20 Claims, 13 Drawing Sheets

U.S. PATENT DOCUMENTS

| | | | |
|---|---|---|---|
| 2002/0195486 | A1 | 12/2002 | Erb et al. |
| 2003/0061162 | A1 | 3/2003 | Matthews |
| 2005/0108104 | A1 | 5/2005 | Woo |
| 2005/0182684 | A1 | 8/2005 | Dawson et al. |
| 2006/0253335 | A1 | 11/2006 | Keena |
| 2007/0150411 | A1 | 6/2007 | Addepalli et al. |
| 2007/0150414 | A1 | 6/2007 | Templeton |
| 2008/0275811 | A1 | 11/2008 | Koningstein et al. |
| 2009/0112760 | A1 | 4/2009 | Johnson et al. |
| 2009/0234746 | A1 | 9/2009 | Jensen et al. |
| 2010/0005025 | A1 | 1/2010 | Kumar et al. |
| 2010/0138344 | A1 | 6/2010 | Wong et al. |

OTHER PUBLICATIONS

"Amazon debuts Honor System." accessed at <http://news.cnet.com/2100-1017-252122.html>. Feb. 6, 2001. (pp. 1-4).

"Amazon Payments Account Management." accessed at <https://payments.amazon.com/sdui/sdui/business?sn=devfps/marketplace>. Jun. 18, 2009. (pp. 1-4).

Co-pending U.S. Appl. No. 12/712,963, entitled "Electronic Payment System and Method" to Shader et al., filed Feb. 25, 2010.

Co-pending U.S. Appl. No. 12/712,972, entitled "Honorary Payment System and Method" to Shader et al., filed Feb. 25, 2010.

Co-pending U.S. Appl. No. 12/712,977, entitled "Transaction Scoring System and Method" to Shader et al., filed Feb. 25, 2010.

Co-pending U.S. Appl. No. 12/712,987, entitled "Invoice System and Method" to Shader et al., filed Feb. 25, 2010.

* cited by examiner

HONORARY CREDIT SYSTEM AND METHOD

BACKGROUND

1. Field of the Invention

The present invention generally relates to a system and method for payment for the purchase goods and services, and more particularly to electronic payments made via an agent for the purchase of electronically transmittable goods and services.

2. Description of Related Art

Advancements in technology are increasingly changing the way many industries conduct business. In the retail industry, for example, goods are often purchased via the internet and subsequently shipped to a consumer. Similarly, many consumers purchase electronically transferable goods and services via the internet or similar communication systems, such as cellular communication networks. Electronically transmittable goods and services often include files (e.g., media files), software applications, and the like.

Purchase transactions involving goods and services (e.g., items) traditionally require that a purchaser provide payment before or at the time or receiving the item. In the case of an internet transaction, for example, an internet retailer typically requires that a purchaser pre-pay for the item before the item is provided to the purchaser. Thus, the purchaser must provide payment to the retailer before the item is shipped, downloaded, e-mailed or otherwise provided. The payment is often provided electronically without any face-to-face interaction between the retailer and the consumer.

Several forms of electronic payment have been developed and are in use. For example, many transactions including using a credit card or an electronic check (e.g., an e-check) to provide payment for items. In the case of a credit card payment, the purchaser typically provides a credit card number and security code associated with an account to be charged. In the case of payment via an electronic check, a purchaser typically provides an American Bankers Association (ABA) routing number, and account number associated with an account to be charged. These methods of electronic payment are typically backed by a financial institution, such as a bank, that pays the retailer and extends credit to the purchaser or debits a monetary amount from the purchaser's account. Thus, the retailer secures payment from the financial institution prior to providing an item, and the purchaser is obligated to reimburse the financial institution.

Although electronic payments may be available to some consumers, other consumers may not have access to certain forms of electronic payment. For example, persons with no credit-cards or bank accounts, such as minors, may not be able to provide electronic payment. Further, some persons may not trust the available forms of electronic payment, for fear of fraud, identity theft, or the like. In order to purchase items over the internet, a purchaser who does not have access to or does not trust the traditional forms of electronic payment may rely on other forms of payment, such as mailing in cash or a check to the retailer. Unfortunately, this may add complexity to sending a payment and delay receipt of the item. Moreover, a consumer may decide to forgo the purchase altogether or at least forgo purchasing the item electronically (e.g., via the internet), opting to purchase the item in person from a traditional brick-and-mortar retail location, when such choice is available. When a consumer is unable to purchase items electronically or decides not to purchase items electronically, this may reduce sales for electronic retailers (e.g., internet retailers) and can limit the items available to the purchaser.

Accordingly, there is a desire to provide a system and method for purchasing items electronically (e.g., via the internet or wirelessly) that is secure and accessible to a large number of consumers, including those who can not use or are hesitant to use existing forms of electronic payment.

SUMMARY

Various embodiments of conducting transactions for electronically transmittable goods via a communication network, and related apparatus, and methods of operating the same are described. In one embodiment, provided is a method for conducting an honorary credit transaction. The method includes receiving a request to purchase an electronically transmittable item of a vendor via electronic communication network, wherein the electronically transmittable item is configured to be received via electronic transmission, providing honorary credit to a purchaser in exchange for an honorary commitment to provide payment for the electronically transmittable item to one or more agents, wherein the honorary commitment comprises a non-legally binding commitment to provide payment to the one or more agents for purchase of the electronically transmittable item, providing the electronically transmittable item to the purchaser via electronic transmission prior to receiving partial or complete payment for the electronically transmittable item, and receiving partial or complete payment for the electronically transmittable item via at least one of the one or more agents.

In another embodiment, provided is a method for conducting a transaction that includes receiving, from a purchaser, a request to receive an intangible good that is electronically transmittable, issuing, to the purchaser, a request for payment for receipt of the intangible good, receiving, from the purchaser, an honorary commitment to provide a purchaser payment to an agent after the intangible good has been received by the purchaser, wherein the agent commits to providing an agent payment on behalf of the purchaser to fulfill the request for payment, wherein the honorary commitment comprises a non-legally binding commitment to provide payment to the agent for purchase of the electronically transmittable item, electronically transmitting, to the purchaser, the intangible good, receiving, after the intangible good has been electronically transmitted to the purchaser, the agent payment on behalf of the purchaser.

In another embodiment, provided is a system for conducting honorary credit transactions of electronically transmittable items. The system includes an honorary payment facilitator that is able to receive a request to purchase an electronically transmittable item of a vendor via electronic communication network, wherein the electronically transmittable item is configured to be received via electronic transmission, to provide honorary credit to a purchaser in exchange for an honorary commitment to provide payment for the electronically transmittable item to one or more agents, wherein the honorary commitment comprises a non-legally binding commitment to provide payment to the one or more agents for purchase of the electronically transmittable item, to provide the electronically transmittable item to the purchaser via electronic transmission prior to receiving partial or complete payment for the electronically transmittable item, and to receive partial or complete payment for the electronically transmittable item via at least one of the one or more agents.

In another embodiment, provided is a method for conducting a transaction for electronically transmittable items. The method includes receiving a request to purchase an electronically transmittable item of an internet vendor, wherein the electronically transmittable item is configured to be received via electronic transmission, requesting a voluntary payment from a purchaser in exchange for providing the electronically transmittable item, wherein the request comprises a request to provide the voluntary payment to one or more third party agents, providing the electronically transmittable item to the purchaser via electronic transmission prior to receiving the voluntary payment for the electronically transmittable item, and receiving the voluntary payment for the electronically transmittable item via at least one of the one or more third party agents.

In another embodiment, provided is a method for conducting a transaction for electronically transmittable items. The method includes receiving a request to purchase an electronically transmittable item of an internet vendor, wherein the electronically transmittable item is configured to be received via electronic transmission, requesting a purchaser provide a payment for the electronically transmittable item to one or more third party agents, wherein the purchaser has the option to select one of the one or more third party agents to provide the payment to, providing the electronically transmittable item to the purchaser via electronic transmission prior to receiving the payment for the electronically transmittable item, and receiving the payment for the electronically transmittable item via at one of the one or more third party agents selected by the purchaser.

In another embodiment, provided is a method for conducting a transaction for electronically transmittable items. The method includes receiving a request to purchase an electronically transmittable item of an internet vendor, wherein the electronically transmittable item is configured to be received via electronic transmission, requesting a voluntary payment from a purchaser in exchange for providing the electronically transmittable item, wherein the request comprises a request to provide the voluntary payment to one or more agents wherein the purchaser has the option to select one of the one or more third party agents to provide the payment to, providing the electronically transmittable item to the purchaser via electronic transmission prior to receiving a voluntary payment for the electronically transmittable item, and receiving the payment for the electronically transmittable item via at one of the one or more third party agents selected by the purchaser.

In another embodiment, provided is a method for conducting an honorary credit transaction. The method includes receiving a request to purchase an electronically transmittable item of an internet vendor, wherein the electronically transmittable item is configured to be received via electronic transmission, assessing honorary credit worthiness of a purchaser requesting to purchase the electronically transmittable item from an internet vendor via electronic transmission, and if the honorary creditworthiness of the purchaser satisfies a credit threshold: providing honorary credit to the purchaser in exchange for an honorary commitment to provide payment for the electronically transmittable item to one or more agents, wherein the honorary commitment comprises a non-legally binding commitment to provide payment to the one or more agents for purchase of the electronically transmittable item, and providing the electronically transmittable item to the purchaser via electronic transmission prior to receiving payment for the electronically transmittable item.

In another embodiment, provided is a method for assessing an honorary credit transaction. The method includes receiving a request to purchase an electronically transmittable item of an internet vendor, wherein the electronically transmittable item is configured to be received via electronic transmission, providing honorary credit to a purchaser in exchange for an honorary commitment to provide payment for the electronically transmittable item to one or more agents, providing the electronically transmittable item to the purchaser via electronic transmission prior to receiving the payment for the electronically transmittable item, receiving the payment for the electronically transmittable item via at least one of the one or more agents, and computing a transactional score, wherein the transactional score is indicative of a purchaser payment for receipt of the electronically transmittable item received by at least one of the one or more agents.

In another embodiment, provided is a method of conducting an honorary credit transaction. The method includes providing a post-payment system configured to accept payment for the purchase of electronically transmittable item, assessing one or more post-payment transactions using the post-payment system to determine a composite credit score associated with a purchase demographic, receiving a purchase request associated with the purchase demographic, wherein the purchase request includes a request to provide honorary credit to a purchaser in exchange for an honorary commitment to provide payment for the electronically transmittable item to one or more agents, wherein the honorary commitment comprises a non-legally binding commitment to provide payment to the one or more agents for purchase of the electronically transmittable item, matching the purchase request with the purchase demographic, assessing the composite honorary credit score associated with the associated purchase demographic, and if it is determined that the composite honorary credit score satisfies a threshold value, providing the electronically transmittable item to the purchaser via electronic transmission prior to receiving payment for the electronically transmittable item.

In another embodiment, provided is a method of conducting a purchase transaction. The method includes providing a payment system comprising a set of universal product codes (UPC's), wherein each of the UPC's of the set comprises a unique value associated therewith, and wherein the UPC's of the set of UPC's are combinable in various combinations to provide a provide a plurality of composite values, receiving a purchase request for an item having a price, determining a payment value associated with the purchase request, assigning one or more UPC's of the set of UPC's to a first invoice, wherein the combination of one or more UPC's assigned comprises a composite value associated therewith equal to the payment value, and withdrawing the one or more UPC's assigned to the first invoice from circulation for a period of time, such that the UPC's are not assignable to a second invoice during the period of time.

In another embodiment, provided is a method of conducting a transaction. The method includes providing a set of universal product codes (UPC's) comprising a plurality of UPC's serviceable by one or more agent retail locations, wherein each of the plurality of UPC's the of the set of universal product codes comprise an associated value, receiving, from a purchaser, a request to purchase an electronically transmittable item via the internet, selecting a UPC subset comprising one or more of the of the plurality of UPC's of the set of UPC's, wherein one or more values associated with one or more of the plurality of UPC's of the UPC subset are indicative of a price of the electronically transmittable item, electronically transmitting, to the purchaser, an invoice comprising the subset of one or more of the plurality of UPC's, receiving the subset one or more of the plurality of UPC's at one or more of the agent retail locations, determining a payment amount based on the one or more values associated with one or more of the plurality of UPC's of the UPC subset that are indicative of the price of the electronically transmittable item, and receiving the amount to be paid at the one or more of the agent retail locations.

In another embodiment, provided is a method of providing an invoice for payment. The method includes providing, in a computer system memory, an indicia set comprising a finite number of indices serviceable by a indicia system, wherein the indicia set includes a subset of indices each having a monetary value associated therewith, receiving a request to provide one or more indices having a net monetary value, assessing the indicia subset to determine a combination of indices comprising a net value equal to the monetary value, wherein the net value comprises a sum of the monetary values associated with each indicia of the combination of indices, and providing the combination of indices for inclusion on the invoice for payment.

In another embodiment, provided is a method for conducting an honorary credit transaction. The method includes providing a system configured to provide honorary credit to a purchaser in exchange for an honorary commitment to provide payment for electronically transmittable item to one or more agents, wherein the honorary commitment comprises a non-legally binding commitment to provide a payment to the one or more agents for purchase of the electronically transmittable item, receiving a request from a first purchaser to provide a second purchaser honorary credit in exchange for an honorary commitment to provide payment for an electronically transmittable item to one or more agents, providing the second purchaser honorary credit in exchange for an honorary commitment to provide payment for the electronically transmittable item to one or more agents, providing the electronically transmittable item to the second purchaser via electronic transmission prior to receiving payment for the electronically transmittable item, and if a payment is received for the electronically transmittable item via at least one of the one or more agents, providing an incentive to the first purchaser.

In another embodiment, provided is a system for conducting an honorary credit transaction. The system includes an honorary payment facilitator able to provide honorary credit to a purchaser in exchange for an honorary commitment to provide payment for electronically transmittable item to one or more agents, wherein the honorary commitment comprises a non-legally binding commitment to provide payment to the one or more agents for purchase of the electronically transmittable item, receive a request from a first purchaser to provide a second purchaser honorary credit in exchange for an honorary commitment to provide payment for an electronically transmittable item to one or more agents, provide the second purchaser honorary credit in exchange for an honorary commitment to provide payment for the electronically transmittable item to one or more agents, provide the electronically transmittable item to the second purchaser via electronic transmission prior to receiving payment for the electronically transmittable item, and if a payment is received for the electronically transmittable item via at least one of the one or more agents, providing an incentive to the first purchaser.

In another embodiment, provided is a method that includes providing honorary credit to a first purchaser in exchange for an honorary commitment to provide payment for electronically transmittable item to one or more agents, wherein the honorary commitment comprises a non-legally binding commitment to provide payment to the one or more agents for purchase of the electronically transmittable item, receiving, form a first purchaser, a request to extend honorary credit to a second purchaser, extending honorary credit to the second purchaser, conducting a transaction with the second purchaser based on the honorary credit, wherein the transaction comprises providing an electronically transmittable item to the second purchaser via electronic transmission prior to receiving payment for the electronically transmittable item, and providing an incentive and/or a penalty to the first purchaser based on positive/negative outcome of the transaction.

BRIEF DESCRIPTION OF THE DRAWINGS

Advantages of the present invention will become apparent to those skilled in the art with the benefit of the following detailed description and upon reference to the accompanying drawings in which.

Figure 1:
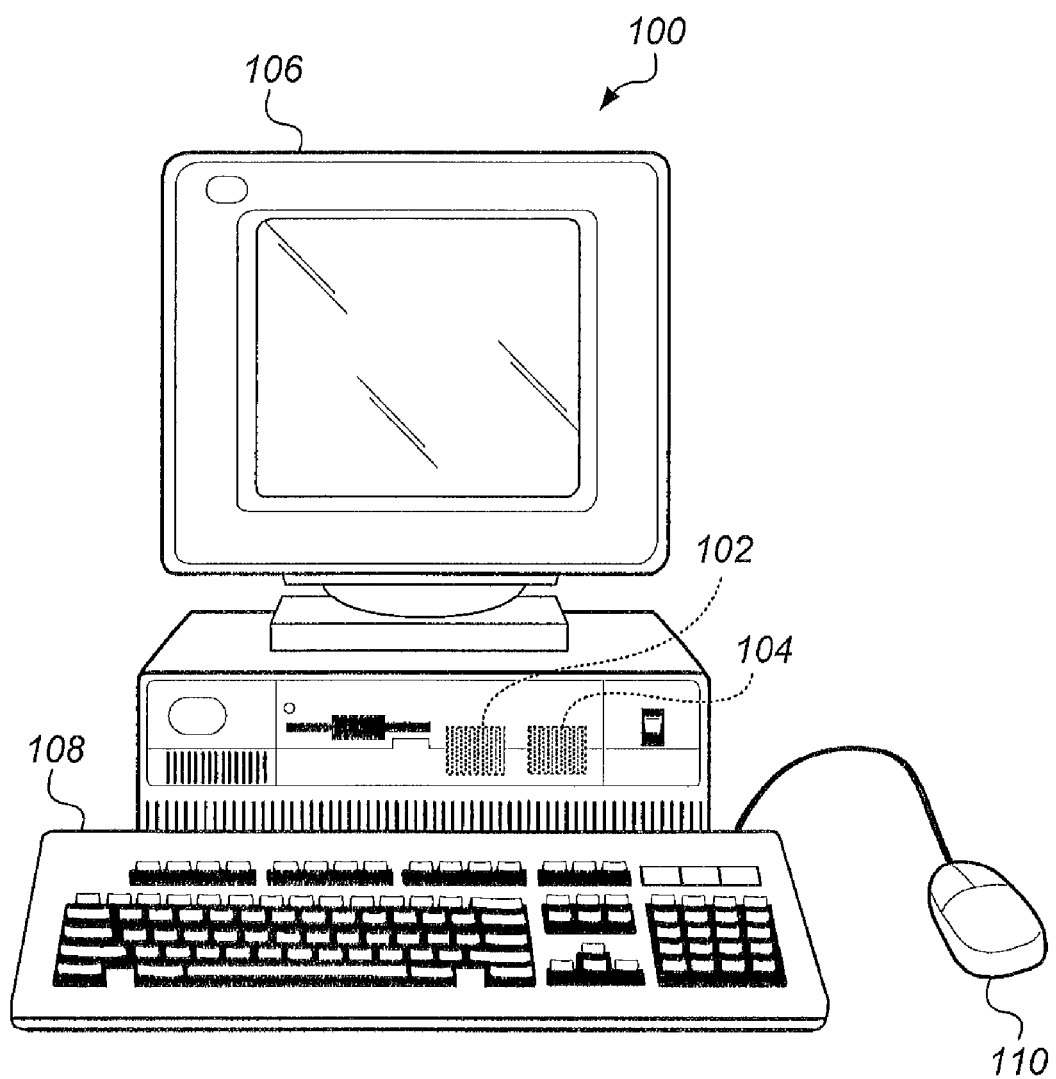
FIG. 1 is a diagram that illustrates an exemplary computer system in accordance with one or more embodiments of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF ILLUSTRATIVE EMBODIMENTS

As discussed in more detail below, certain embodiments of the present technique include a system and method for the purchase of goods and services via an electronic communications network ("network"), such as the internet. In certain embodiments, a method and system is provided that enables a purchaser to submit a request to purchase a good or service (e.g., an item) via the network, to provide a commitment to provide a payment for the item via an agent, and to receive the item via the network. In certain embodiments, the item includes an electronically-transmittable item. In certain embodiments the electronically-transmittable item includes data (e.g., media files, applications, or software).

In some embodiments, a commitment for payment includes a commitment to provide a payment for the item after the item has been received (e.g., a post-payment). In some embodiments, honorary credit is extended to the purchaser such that the purchaser receives the item in exchange for an honorary (e.g., non-legally binding) commitment to provide payment for the item at a later time. In certain embodiments, a payment is provided to an agent and the agent forwards payment upstream to an honorary payment facilitator and/or a vendor. In some embodiments, the agent includes a private party (e.g., a family member or friend) that receives the payment and forwards at least a portion of the payment (e.g., via a credit card payment) upstream. In some embodiments, the agent includes a retail merchant (e.g., a convenience store) that receives the payment and forwards at least a portion of the payment (e.g., via a retail network) upstream. In certain embodiments, the retail merchant includes a brick-and-mortar location (e.g., a store location) where the purchaser submits payment for the purchased item. In certain embodiments, the retail merchant includes use of a stored value card, where the purchaser submits payment for the purchased item with a previously purchased stored value card.

In some embodiments, the purchaser has the option to select an agent to submit their payment to. In certain embodiments, the purchaser is presented with a listing of qualified agents, the purchaser selects at least one of the qualified agents to make the payment to, and subsequently makes the payment to the selected agent. In some embodiments, one or more of the qualified agents may be recommended to the purchaser (e.g., recommended based on a relationship and/or proximity to the purchaser).

In some embodiments, the purchaser has the option to decide how much to pay each vendor for the received items (e.g., allocate payment among vendors). In certain embodiments, the purchaser is requested to pay a certain amount, however, the purchaser may have the option to pay the requested amount, to pay less than the requested amount (e.g., a partial payment), or to pay more than the requested amount. For example, where a purchase provides an honorary commitment to pay a full amount of $10, the purchaser may have the option to make a partial payment of less than the full amount (e.g., $5). In some embodiments, the purchaser is not adversely affected by paying less than the requested amount.

In some embodiments, a score is associated with a transaction. In certain embodiments, the score is based on results of similar transactions associated with other purchasers and/or transactions associated with the purchaser. In some embodiments, the score is based on the likelihood of payment or the likelihood of delays associated with payments. In some embodiments, the item is or is not provided to the purchaser based on the score.

In some embodiments, a user of the honorary credit based payment system recommends (e.g., sponsors or vouches for) another person who they believe should receive honorary credit without personal obligation to pay should the other person fail to fulfill the promise. In certain embodiments, the user is provided incentives based on the interaction with the person they recommended. In certain embodiments, the user receives rewards (e.g., credits redeemable for merchandise, monetary rewards, or the like) for positive interaction with the recommended person (e.g., where the recommended person makes timely payments). In certain embodiments, the user is re-assessed (e.g., subject to a reduction in a honorary credit worthiness score, reduction in credits, the withdrawal of previously extended benefits, or the like) for negative interaction with the recommended person (e.g., where the recommended person does not make sufficient and/or timely payments).

In some embodiments, an invoice is provided that facilitates payments made to an agent. In certain embodiments, the invoice includes information that enables an agent to determine a payment amount and/or who to credit a payment to. In some embodiments, an invoice includes promotional material to induce payment and/or increase retail traffic at an agent location. In certain embodiments, the invoice includes coupons or similar promotional material redeemable for discounts, merchandise, or the like. In certain embodiments, a purchase from a vendor may require the vendor to fulfill a promise on behalf of the purchaser.

In some embodiments, the invoice includes one or more indicia, such as universal product codes (UPC's) that are serviceable by an agent. In some embodiments, the UPC's can be scanned by an agent's UPC system and used to determine a payment amount and/or associate a payment with the purchaser. In some embodiments, a set of UPC's are provided that can be implemented into a retailer's existing UPC system. In certain embodiments, UPC's provided to the purchaser are drawn from the set of UPC's and are recycled so that only a limited number of UPC's are required to facilitate use of the payment system. In certain embodiments, UPC's are withdrawn when they are issued so that they may not be reissued to another purchaser, and are reinstated after a certain period of time. In some embodiments, the UPC's are reinstated after a fixed period of time after being issued or after a purchaser uses them to make a payment. Although embodiments are described herein with respect to UPC's, it will be appreciated that similar embodiments may be provided using similar forms of indicia, such as serial numbers.

Embodiments of the payment system herein, provide an honorary payment system that enables many persons access to purchase items via electronic communications networks. For example, a purchaser that may otherwise be hesitant to provide their credit card information to an internet retailer may simply provide an honorary commitment to pay a friend (e.g., an agent) who is willing to forward the payment on behalf of the purchaser using the friend's credit card information. Similarly, the purchaser may commit to provide an honorary commitment to make a payment to a retail store at a local brick and mortar location, such that the retail store forwards a payment on behalf of the purchaser. In such embodiments, the purchaser is able to receive an electronically-transmittable item in exchange for an honorary commitment to provide a post-payment to an agent. In certain embodiments, the payment system provides some sense of security to the vendor that a post payment will be made to an agent. For example, a vendor of the item is provided creditworthiness information to help make a decision on whether or not to provide the item. In some embodiments, the logistics of the transaction are facilitated by an honorary payment facilitator. For example, in some embodiments, an honorary payment facilitator provides a centralized location for initiating, tracking and routing various aspects of the transaction. In some embodiments, the honorary payment facilitator tracks memberships to the payment system, tracks honorary creditworthiness of purchasers, and routes payments between agents and vendors.

Turning now to the figures, FIG. 1 depicts an exemplary computer system 100 which may implement embodiments of the invention. Computer system 100 may be operable to execute computer applications to implement transactions for the purchase of goods and services as described herein. Computer system 100 may include various components such as CPU 102 and a memory medium 104. Memory medium 104 may include a tangible memory medium such as random access memory (RAM), flash memory, hard-drives, and/or CD-ROMs, or the like. Memory medium 104 may include a storage medium having program instructions stored thereon that are executable to implement one or more embodiments of the present technique. The program instructions may be executable by CPU 102 to implement one or more methods associated with the preset technique. In the illustrated embodiment, computer system 100 includes a display device 106 (e.g., a monitor), an alphanumeric input device 108 (e.g., a keyboard), and a directional input device 110 (e.g., a mouse). In some embodiments, computer system 100 may include modular and plug-in boards/cards (e.g., with either commercially available or proprietary hardware) that may be added via a number of expansion slots internal or external to the computer body. Computer system 100 may be connected to a network that enables communication with other computer systems and devices connected to the network. In some embodiments, computer system 100 may be connected to the internet. For example, computer system 100 may include a wired or wireless connection that provides access to the internet. Computer system 100 may access the internet via a browser or similar application executed thereon.

Figure 2A:
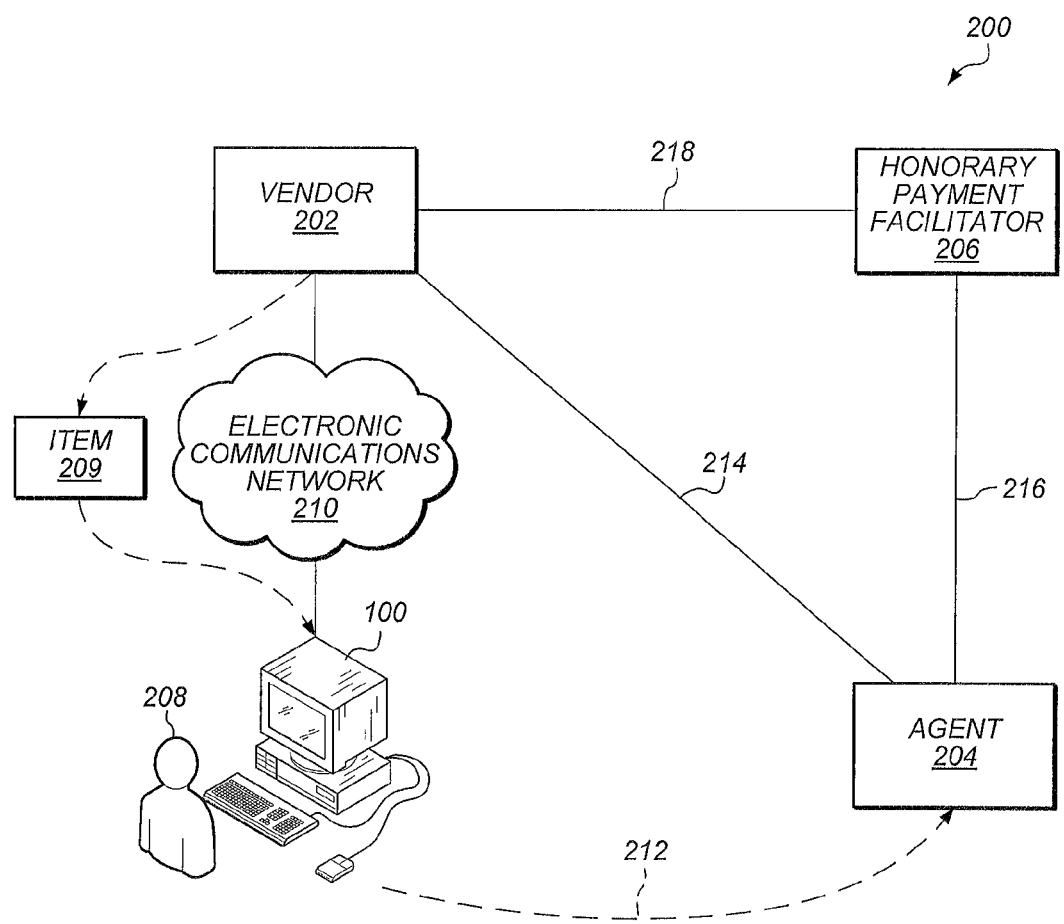
FIG. 2A is a schematic diagram that illustrates a payment system having a single agent in accordance with one or more embodiments of the present technique.

FIG. 2A is a schematic diagram that illustrates a payment system 200 in accordance with one or more embodiments of the present technique. In the illustrated embodiment, payment system 200 includes computer system 100, a vendor 202, an agent 204, and an honorary payment facilitator 206. Payment system 200 may be used to initiate and complete transactions, such as the purchase/transfer of electronically transferable items. In some embodiments, upon request by purchaser 208, vendor 202 may provide an electronically transferable item 209 (e.g., electronic data/file) to system 100 via a communications network 210 prior to receiving payment for the item and in exchange for an honorary commitment for payment. In some embodiments, vendor 202 may include a publisher of electronically transferable item 209, such as an online content/application provider that publishes electronically transferable items that are accessible by a purchaser. The honorary commitment for payment may include a non-legally binding commitment to provide payment (e.g., a full or partial payment) to an agent for purchase of the electronically transmittable item at a later time. After receiving the item and providing the honorary commitment, purchaser 208 may provide a payment (e.g., a purchaser payment) to agent 204, as indicated by dashed line 212, and agent 204 may in turn provide a corresponding payment (e.g., an agent payment) directly to vendor 202 or directly to honorary payment facilitator 206, as depicted by lines 214 and 216, respectively. In some embodiments, honorary payment facilitator 206 may provide a corresponding payment (e.g., a vendor payment) to vendor 202, as depicted by line 218.

In some embodiments, one or more portions of computer system 100, vendor 202, agent 204 and honorary payment facilitator 206 may be interconnected to one another. For example, computer system 100 may be connected to vendor 202 via an electronic communications network 210, such as the internet, a local area network, a wireless cellular network, or the like. Agent 204 may be directly connected to vendor 202 as indicated by line 214, or indirectly connected to vendor 202 via honorary payment facilitator 206, as indicated by lines 216 and 218. In some embodiments, direct communication may occur from one component to another where the communication is not passed through another component of payment system 200. For example, agent 204 may communicate directly with honorary payment facilitator 206 via connection 214, and agent 204 may communicate indirectly with vendor 202 via connection 216, honorary payment facilitator 206 and connection 218.

Each of connections 210, 214, 216, and 218 may include any variety of connection types capable of supporting communication between the various components. For example, connections 210, 214, 216, and 218 may include connections via the internet, a local area network, a wireless cellular network, or the like. Connections 210, 214, 216, and 218 may include any combination of cabled connections, wireless connections, and the like. For example, cabled connections may include land-line telephone service, cabled connection to an internet service provider, and/or hard-wired LAN connections. Wireless connections may include various forms of wireless telecommunication (e.g., wireless cellular communication networks), wireless LAN systems (e.g., wireless routers), and the like.

In some embodiments, vendor 202 may include a vendor of good and/or services (e.g., items). Vendor 202 may include a retailer that sells or otherwise provides electronically transferable items that can be ordered/purchased via a communications network, such as the internet or a cellular communications network. For example, electronically transferable items provided by, or otherwise available from, vendor 202 may be accessed, retrieved, and/or received by purchaser 208 via communication network 210. In some embodiments, vendor 202 may include an internet retailer that host a website or similar interface that facilitates the purchases of electronically transmittable items. For example, vendor 202 may include an on-line media retailer/provider, gaming retailer/provider, software/application retailer/provider, or the like, that provides media content, gaming content, software/application content or the like. Media content may include digital music files (e.g., mp3 files), electronic books, digital pictures, digital videos, and the like. Gaming content may include electronic games, such as those typically run on a personal computer, home entertainment/gaming system, portable entertainment/gaming system, or the like. Software/application content may include executable programs traditionally stored an executed on computing devices such as personal computers, portable computers, industrial computers, personal digital assistants (PDA's), cellular phone, or the like.

Electronically transferable items may include data that can be electronically transmitted from one device to another. For example, electronically transferable items may include a data file (e.g., files, applications, or software that can be transferred from one computer system to another computer system), a gaming application, a software application, virtual goods, virtual currency, postage, images or permit access to any such application or service. In some embodiments, electronic transfer of items may include electronic transfer of data from one device to another (e.g., via downloading or e-mailing). Downloading may include sending data from a memory location of one computer device to a memory location of another device via electronic communication network 210. In some embodiments, the electronically transferable items are deployable on a target system. For example, a service stored on a computer system of vendor 202 may remotely access computer system 100 (e.g., via electronic communication network 210) and execute certain functions on computer system 100. A service may include a remote scan (e.g., a virus scan) of a purchaser's computer system 100 that is initiated and/or executed from a computer system of vendor 202.

In some embodiments, item 209 may be provided in a non-tangible form during an electronic transfer process. For example, item 209 may be stored in a memory location (e.g., a server) of vendor 202 in a tangible form, transferred via a communications network 210 in a non-tangible form to computer system 100, and/or stored in a memory location (e.g., hard-disk or database) of computer system 100 in a tangible form. In some embodiments, item 209 may be stored (e.g., reproduced) on a portable memory medium, such as a floppy disc, a flash memory device, a compact disc read-only memory (CD-ROM), a digital video disc (DVD), or the like.

In some embodiments, vendor 202 may provide item 209 to purchaser 208 prior to receiving a monetary payment for item 209. In some embodiments, for instance, vendor 202 provides item 209 to purchaser 208 in exchange for an honorary commitment to provide a purchaser payment (e.g., a full or partial payment) to agent 204. Agent 204 may forward at least a portion of the purchaser payment upstream to vendor 202 and/or an honorary payment facilitator 206. Agent 204 may include an entity that collects payment from a purchaser and forwards at least a portion of the payment upstream to a source of item 209. For example, agent 204 may act as an intermediary that accepts a purchaser payment from purchaser 208 and forwards a corresponding agent payment to an entity responsible for collecting the payments, such as vendor 202 and/or honorary payment facilitator 206. In some embodiments, agent 204 is party to an agreement with vendor 202 and/or honorary payment facilitator 206 to receive a purchaser payment on behalf of purchaser 208 for the purchase of an item from vendor 202 (e.g., a payment from a purchaser who used computer system 100 to purchase the item from vendor 202 via communication network 210), and to provide a corresponding agent payment to vendor 202 and/or honorary payment facilitator 206. The agent payment may be provided directly to vendor 202 from agent 204, as represented by line 214, or directly to honorary payment facilitator 206 from agent 204, as represented by line 216. In some embodiments, agent 204 may be provided a commission for facilitating the transaction. For example, the agent payment may be provided in an amount equal to the purchaser payment reduced by a commission paid to or otherwise withheld by agent 204.

In some embodiments, agent 204 may include a private party individual such as a family member, friend, neighbor, co-worker or the like who is willing to receive a purchaser payment from a purchaser 208 and submit a corresponding agent payment to vendor 202 and/or honorary payment facilitator 206 of the payment system 200. In some embodiments, agent 204 may include a business entity, such as a retail merchant, willing to receive purchaser payment from purchaser 208 and submit a corresponding agent payment to vendor 202 and/or honorary payment facilitator 206 of payment system 200. In some embodiments, the business entity includes a retail merchant having a brick-and-mortar location where purchaser 208 may make the purchaser payment. For example, the retail merchant may include a convenience store, a grocery store, a department store, a restaurant, a kiosk, or the like, that can receive a purchaser payment at the brick-and-mortar location. In some embodiments, purchaser 208 may be provided with an invoice that can be provided to a clerk and/or Point of Sale (POS) terminal at the retail location and the clerk may collect a purchaser payment based on the invoice. The invoice may include various types of information relating to the transaction, as discussed in more detail below with respect to FIGS. 6A-6B. By enabling a purchaser 208 to provide payment at the business location of agent 204, it may be said that vendor 202 has "virtual shelf space". That is a vendor would be able to sell/market their product through the agent's retail location without having to provide a physical product at the agent's location. For example, vendor 202 may have virtual shelf-space at the brick-and-mortar location of agent 204 where purchaser 208 is able to purchase (e.g., provide payment for) the given item, even though the item is not physically located at the brick-and-mortar location.

In some embodiments, agent 204 may provide an agent payment and/or notification of purchaser payment directly to vendor 202 and/or honorary payment facilitator 206. For example, in an embodiment in which payment is provided directly to vendor 202, after receiving a purchaser payment from the purchaser, agent 204 may electronically transfer funds or otherwise notify vendor 202 via connection 214. In some embodiments, honorary payment facilitator 206 may act as an intermediary that facilitates payments and/or communication of information between vendor 202 and/or agent 204. For example, in some embodiments where an agent payment is provided directly to honorary payment facilitator 206, agent 204 may electronically transfer funds or otherwise notify honorary payment facilitator 206 directly via connection 216 after receiving a purchaser payment from purchaser 208.

In some embodiments, a series of agents 204 may be used provide an honorary commitment to pay. For example, a first agent may use a second agent, and so forth, that ultimately secures payment to system 200. For example, a minor may select their parent as an agent, and the parent may select their neighbor as an agent, and so forth. Such an embodiment may allow a network of agents to indirectly provide a service to the purchaser. This may be of particular use where two agents trust one another, and one of the agents would like to accept payment from the purchaser, although they do not have the means to provide the payment. For example, the parent may contact the neighbor when they do not immediately have funds to make the payment, but will make a payment to the neighbor at a later time on behalf of the minor. The series of honorary commitments between multiple agents may be referred to as a compounding honorary commitment to pay.

Honorary payment facilitator 206 may include an entity responsible for collecting agent payments from agents and distributing corresponding vendor payments to vendors. In some embodiments, honorary payment facilitator 206 may act as an intermediary that collects agent payments and provide one or more corresponding vendor payments to vendor 202. As described in more detail below, in some embodiments, honorary payment facilitator 206 may track current and past dealing of purchasers, provide relevant decisions or information for making decisions to other portions of payment system 200. For example, honorary payment facilitator may provide vendor 202 with invoicing information, as described in more detail below with regard to FIGS. 7A-7C.

In some embodiments, honorary payment facilitator 206 is party to an agreement with vendor 202 to receive an agent payment from agent 204 (e.g., a payment corresponding to a purchaser payment made to agent 204 on behalf of purchaser 208), and to provide a corresponding vendor payment to vendor 202. In certain embodiments, the vendor payment may be provided directly from honorary payment facilitator 206 to vendor 202, as represented by line 218. In some embodiments, honorary payment facilitator 206 may be provided a commission for facilitating the transaction. For example, the vendor payment may be provided in an amount equal to the agent payment reduced by a commission paid to or otherwise withheld by honorary payment facilitator 206. In some embodiments, the vendor payment may be provided after or before one or both of the agent payment and the purchaser payment. For example, honorary payment facilitator 206 may provide the vendor payment to vendor 202 after confirming receipt of purchaser payment and/or after receiving the agent payment from agent 204. In some embodiments, agent 204 may notify honorary payment facilitator 206 of the purchaser payment prior to providing the agent payment so that the vendor payment can be made even before the agent payment.

In some embodiments, honorary payment facilitator 206 may collect and provide transactional information that can be used by one or more portions of payment system 200 to assess and determine how to conduct one or more portions of an honorary credit based transaction. For example, honorary payment facilitator may track past dealing with purchasers in an attempt to predict whether or not a purchaser is likely to provide a timely purchaser payment. In some embodiments, honorary payment facilitator 206 may receive information relating to a purchaser and assess whether or not to continue with a requested transaction based on the assessment. For example, in some embodiments, honorary payment facilitator 206 may assess each purchase made by a purchaser based on aspects of prior transactions, such as whether or not a purchaser payment was received, an amount of the purchaser payment, delay in making the payment, and so forth. As a result of the assessment, honorary payment facilitator 206 may determine one or more indices, such as a composite score, associated with purchaser 208. In certain embodiments, a score may be based on assessments of prior transactions by the respective purchaser and/or prior transactions of other purchasers. In some embodiments, when purchaser 208 requests to purchase an item from vendor 202, honorary payment facilitator 206 and/or vendor 202 may assess one or more indices associated with purchaser 208 to determine whether or not to complete the purchase transaction. For example, a composite score associate with the purchaser may be compared to a threshold value, and if the composite score satisfies the threshold value (e.g., meets of exceeds a minimum value), the transaction may be completed and vendor 202 may provide the requested item to purchaser 208 in exchange for commit by purchaser 208 to provide a purchaser payment agent 204. However, if the composite score does not satisfy the threshold value (e.g., does not meet or exceed a minimum value), the transaction may be not be completed and/or vendor 202 may require a complete pre-payment or partial pre-payment for the item before providing the requested item to purchaser 208. In some embodiments, one or more characteristics of the transaction may be altered based on the transaction score. For example, a purchaser may be offered various types of promotions based on their credit score. Certain embodiments relating to determining one or more indices, such as a composite score, relating to the purchaser and/or transactions are described in more detail below with respect to FIGS. 4A-4C.

Figure 2B:
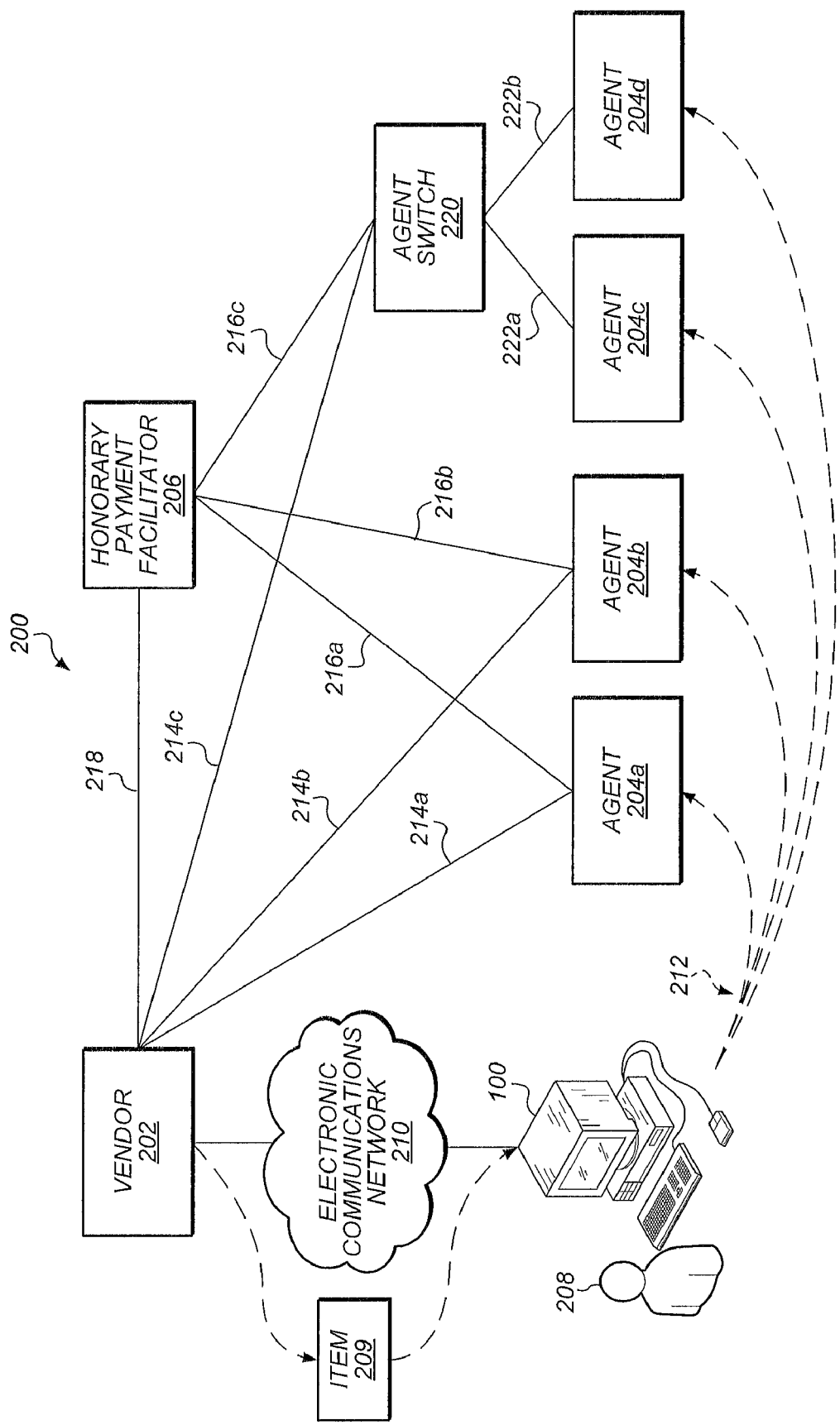
FIG. 2B is a schematic diagram that illustrates a payment system having a plurality of agents in accordance with one or more embodiments of the present technique.

Although the above embodiments have been discussed with regard to a single agent 204, embodiments of payment system 200 may include any number of agents 204 and vendors 202. Certain embodiments may include additional communication channels to support a plurality of agents 204. FIG. 2B is a schematic diagram that illustrates payment system 200 having a plurality of agents in accordance with one or more embodiments of the present technique. For example, the illustrated embodiment includes four agents 204a-204d. Each of agents 204a-204d may be similar to agent 204 described above. In some embodiments, all or at least some of agents 204a-204d are capable of receiving a purchaser payment from or on behalf of purchaser 208, as illustrated by dashed lines 212.

In certain embodiments, one or more of agent 204a-204d may be in direct communication with vendor 202 and honorary payment facilitator 206, as illustrated by lines 214a, 214b, 216a and 216b. Accordingly, agents 204a and 204b may communicate with one another as described above. As depicted in the in the illustrated embodiment, one or more of agents 204a-204d may communicate indirectly with vendor 202 and/or honorary facilitator 206 via an agent switch 220. In some embodiments, agent switch 220 may act as an intermediary that consolidates communications between one or more of agents 204c and 204d, and vendor 202 and/or honorary payment facilitator 206. For example, agent switch 220 may receive communications (e.g., agent payments) from agent 204c and 204d via connections 222a and 222b, respectively, and may transmit corresponding communications to vendor 202 or honorary payment facilitator 206 via a single connections, 214c and 216c respectively. In some embodiments, agent switch 220 may include an upstream portion of an entity that processes data from multiple agents. For example, where agents 204c and 204d include convenience stores, agent switch 220 may include a headquarters of the convenience stores that traditionally receives sales information from each of the agent convenience stores 204c and 204d. In some embodiments, agent switch 220 may consolidate information exchanged with agents 204c and 204d and provided corresponding consolidated communications to vendor 202 and/or honorary payment facilitator 206. For example, agent switch 220 may provide a periodic report, such as a summary of the communications received from agents 204c and 204d. In some embodiments, agent switch 220 may receive indications of purchaser payments at agents 204c and 204d over a period of time (e.g., a day), consolidate the payment information, and periodically (e.g., daily) provide the payment information along with a consolidated agent payment in an amount corresponding to the total amount of purchaser payments received during the period. Accordingly, agent switch 220 may be employed to consolidate communications to simplify the number, frequency, and content between agents, vendors and honorary payment facilitators.

Embodiments of payment system 200 described herein may be used to implement various transactions, including honorary credit based transactions, as described in more detail below. In certain embodiments, payment system 200 facilitates a method for conducting an honorary credit transaction that includes receiving, via electronic transmission, a request to purchase electronically transmittable item 209 from vendor 202, providing honorary credit to purchaser 208 in exchange for an honorary commitment to provide payment for the electronically transmittable item to agent 204, providing electronically transmittable item 209 to purchaser 208 via electronic transmission prior to receiving payment for the electronically transmittable item 209, and receiving payment for electronically transmittable item 209 via agent 204.

Figure 3:
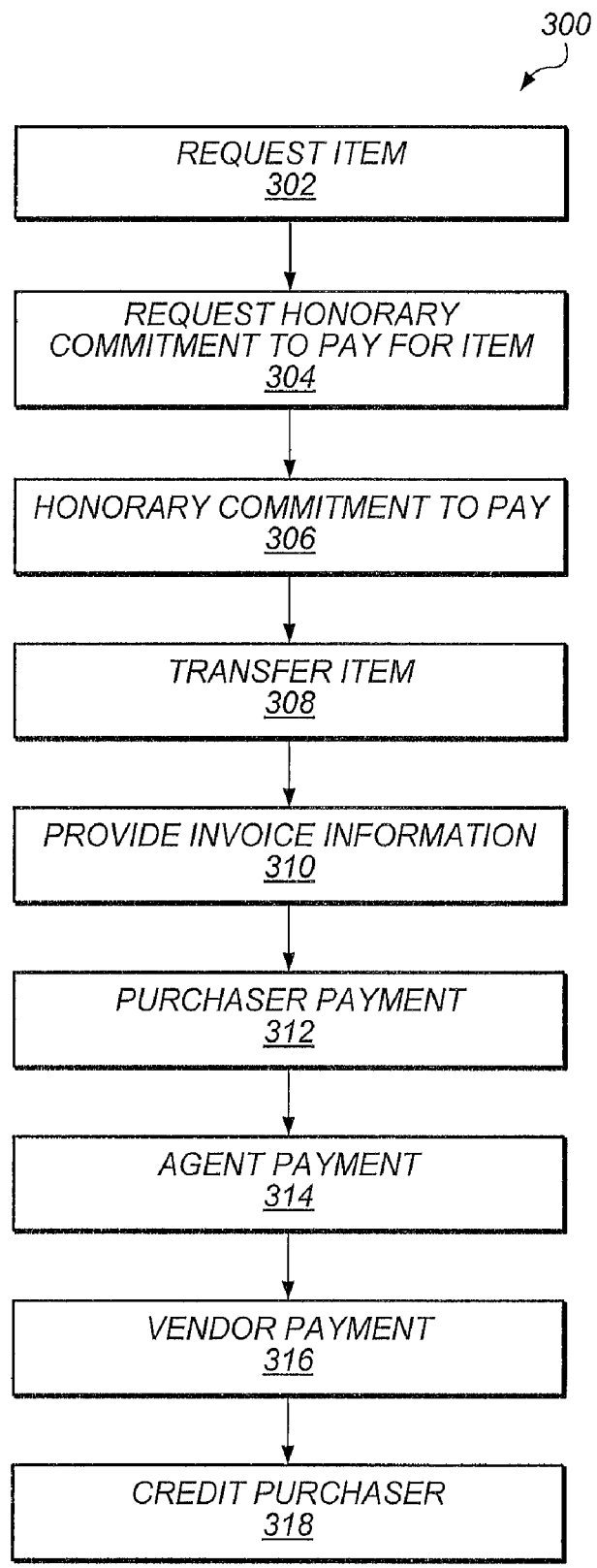
FIG. 3 is a flowchart that illustrates a method of conducting a transaction in accordance with one or more embodiments of the present technique.

FIG. 3 is a flowchart that illustrates a method 300 of conducting an honorary credit based transaction, in accordance with one or more embodiments of the present technique. Method 300 generally includes providing a request for an item, providing a request for an honorary commitment to pay, providing an honorary commitment to pay, transferring the item, providing a purchaser payment, providing a corresponding agent payment, and providing a corresponding vendor payment. Thus, some embodiments of method 300 may include purchaser 208 requesting electronically transferable item 209 from an internet vendor 202, vendor 202 may request at least an honorary commitment to payment from purchaser 208, purchaser 208 may provide an honorary commit to make a payment to agent 204 in exchange for item 209, vendor 202 may provide item 209 to purchaser 208 via electronic communications network 210, purchaser 208 may provide a purchaser payment to agent 204, agent 204 may forward a corresponding agent payment to honorary payment facilitator 206 and/or vendor 202, and/or honorary payment facilitator 206 may forward a corresponding vendor payment to vendor 202.

In the illustrated embodiment, method 300 includes a request for an item, as depicted at block 302. In some embodiments, a request for an item may include vendor 202 and/or honorary payment facilitator 206 receiving a request to receive electronically transmittable item 209 from purchaser 208. In some embodiments, a request for an item includes a purchaser indicating a desire to receive or otherwise use an item. For example, in an embodiment including a purchaser 208 is browsing a website of vendor 202 using computer system 100, receiving a request for item 209 may include purchaser 208 selecting and placing item 209 in an electronic shopping cart.

In some embodiments, upon receiving a request for item, a vendor may wait for an indication that purchaser is ready to continue with the transaction or may automatically request payment for the item. For example, in an embodiment that includes purchaser 208 providing the request via a website, the website may wait to receive a purchaser request to "checkout" before proceeding to a page requesting payment for item 209. In some embodiments, upon selection of item 209, the website may simply direct purchaser 208 to a webpage requesting payment for item 209 when the item is selected.

In the illustrated embodiment, method 300 includes requesting an honorary commitment to pay for the item, as depicted at block 304. In some embodiments, requesting an honorary commitment to pay includes a vendor requesting that the user provide a payment or at least an honorary commitment to provide a payment at a later time. For example, a website associated with vendor 202 (e.g., a vendor website) may redirect purchaser 208 to a webpage that defines certain terms of payment.

In some embodiments, a request for an honorary commitment to pay for an item may provide terms and conditions of the purchase. For example, a request for payment may include a listing of any legally binding obligations arising from an agreement to commit to purchase the item as well as any non-legally binding terms and conditions of the agreement. In some embodiments, the terms and conditions may include consequences associated with failure to abide by the agreed upon terms. For example, terms and conditions may indicate that where purchaser 208 agrees to make a purchaser payment of a given amount to a selected agent 204 within a given time frame, purchaser 208 may be re-assessed if the purchaser payment is not made in full, is not made to the selected agent 204, and/or is not made within the time frame. Consequences may include additional fees and/or a negative affect on a score associated with the purchaser. In some embodiments, the purchaser may be required to agree to certain terms before the item is provided to the purchaser. For example, in some embodiments, purchaser 208 may be provided with one or more purchase instructions that include a request for payment along with instructions for how payment is to be made to an agent, and purchaser 208 may be required to provide an indication that they agree with the terms or the requested payment and the provided instructions before item 209 is transferred to purchaser 208.

In some embodiments, a request for an honorary commitment to pay for an item may include a request that the purchaser provide a payment based on the items requested. For example, where purchaser 208 requests download of a music file having a price of $0.99, purchaser 208 may be requested to provide a commitment to make a payment in the amount of $0.99. In some embodiments, a purchaser may be requested to provide at least a partial payment. For example, purchaser 208 may be requested to pay at least $0.50 of the $0.99 price for the file. In such an embodiment, purchaser 208 may have an explicit option to pay only a portion of the full purchase price. Where multiple items are purchased, purchaser 208 may be requested to provide a commitment to make a payment in the amount of the combined total price of the items. In some embodiments, a request for an honorary commitment to pay for an item account for additional fees, discounts, or other adjustments in price that are reflected in the payment. For example, a request for an honorary commitment to pay may include an adjustment in the requested payment amount to account for additional taxes and fees, such as those fees associated with a membership required to receive honorary credit from vendor 202. Similarly, a request for an honorary commitment to pay may include an adjustment in the requested payment amount to account for credits or promotional discounts, such as a buy-one-get one free promotion, associated with purchase of an item.

A request for an honorary commitment to pay for an item may include any variety of other request or requirements relating to facilitating the transaction. In some embodiments, the purchaser may be provided the option to select from one or more methods of payment. For example, in some embodiments, a website of vendor 202 may provide purchaser 208 the option to pay via cash/check, e-check, credit card, and/or one or more agents 204. Accordingly, the transaction may proceed based on the option selected by a purchaser. Where purchaser selects cash, for instance, the purchaser may be provided with instructions for mailing a cash/check payment. Where a purchaser selects e-check or credit card, the purchaser may be directed to provide relevant credit card account information or checking account information to complete the transaction. Where a purchaser selects payment via an agent, the purchaser may be directed to provide information and/or receive instructions related to the agent based payment. For instance, upon selecting the agent based payment using payment system 200, purchaser 208 may be redirected to a webpage that facilitates the agent based transaction. In some embodiments, the webpage may be associated with vendor 202 and/or honorary payment facilitator 206. Purchaser 208 may be prompted to login into or to register for an account that facilitates an honorary credit based transaction, including a request to make payment via an agent (e.g., an account associated with vendor 202 or honorary payment facilitator 206). Upon logging into an account or otherwise being redirected to a webpage that facilitates an honorary credit based transaction, the purchaser may be provided with transaction information and/or provide relevant purchaser information. In some embodiments, purchaser 208 may receive and/or provide information relating to the agent based transaction at the initial webpage, without being redirected. For example, upon purchaser 208 selecting payment via an agent, the webpage may be updated to include instructions and data entry fields that appear integrated into the initial web page such that purchaser 208 can provide similar transaction information and/or relevant purchaser information as described above.

In some embodiments, a request for an honorary commitment to pay for an item may include a listing one or more agents for the purchaser to make a purchaser payment to. For example, a webpage displayed to purchaser 208 via computer system 100 may include a listing of one or more agents 204 (e.g., agents 204a-204d) that are qualified to receive payment from purchaser 208. Qualified agents may include one or more agent(s) that are party to agreements with honorary payment facilitator 206 and/or vendor 202, wherein the agreements include a commitment to receive a purchaser payment from purchaser 208 and to submit a corresponding agent payment to vendor 202 and/or honorary payment facilitator 206 of payment system 200.

In some embodiments, payment system 200 may store in memory, or otherwise have access to, a listing of agents (e.g., a master listing of agents). For example, in some embodiments, honorary payment facilitator 206 may include a listing of agents 204a-204d stored in a memory thereof. In some embodiments, the honorary payment facilitator may have remote access to a listing of agents, such as a listing of agents stored on a database operated by a third party. In certain embodiments, at least a portion of the listing of agents may be provided to the purchaser at the time of the request for an honorary commitment to pay so that the user may be made ware of and select one or more of the qualified agents. For example, upon receiving a request for item 209, vendor 202 may query honorary payment facilitator 206 for qualified agents, honorary payment facilitator 206 may provide vendor 202 with a listing of qualified agents, and vendor 202 may provide the listing to purchaser 208. In some embodiments, honorary payment facilitator 206 and/or vendor 202 may filter the listing of agents to provide a listing of agents suitable for purchaser 208. In some embodiments, filtering may include determining qualified agents based on one or more characteristics of the transaction. For instance, filtering of the listing of agents may include assessing which of agents 204a-204d have agreed to terms and conditions of payment system 200 that are consistent with the current transaction, which of agents 204a-204d are in good standing, and/or which of agents 204a-204d are qualified to conduct a portion of a respective transaction type. In some embodiments, honorary payment facilitator 206 and/or vendor 202 may assess and determine which of agents 204a-204d are in close proximity to purchaser 208 (e.g., within 1, 2, 3, 4, 5, 6, 7, 8, 9, 10 miles and so forth, of purchaser 208) and may only provide to purchaser 208 a listing of those agents 204 in close proximity to purchaser 208.

In some embodiments, the listing of agents displayed may include a suggestion/recommendation/ranking of one or more agents over other agents. In certain embodiments, a suggestion/recommendation/ranking of agents is based on a relationship of the agent to the purchaser. For example, an agent having a close relationship with purchaser 208 (e.g., family member or friend) may be suggested/recommended/ranked above other agents, having a more distant relationship with purchaser 208 (e.g., an individual or a merchant retailer with no apparent personal relationship with the purchaser). In certain embodiments, a suggestion/recommendation/ranking of agents is based on past dealings with one or more agent. For example, an agent 204 that purchaser 208 has used in prior transactions may be ranked above an agent that purchaser 208 has not used previously. In some embodiments, a suggestion/recommendation/ranking of agents may be based on a proximity to the purchaser. For example, an agent 204 having a close proximity to purchaser 208 (e.g., a retail merchant having a location near the purchaser) may be ranked above other agents, located a greater distance from purchaser 208 (e.g., a retail merchant having a location farther from the purchaser). In some embodiments, a suggestion/recommendation/ranking of agents may be based on a characteristic/type of the request/purchase. For example, one agent 204 may be better suited for handling large purchaser payment amounts than other agents, and as such agent 204 (e.g., a retail merchant) may be ranked higher than another agent (e.g., an individual) when a purchaser payment amount associated with the request for an honorary commitment to pay exceeds a corresponding threshold value (e.g., purchaser payment amounts over $10, $50, $100, $500, $1000, $5000, $10,000 or more).

In some embodiments, payment system 200 may dynamically update a listing of agents. For example, in some embodiments, honorary payment facilitator 206 may dynamically assess/update the listing of agents 204a-204d to determine which agents are qualified, and may remove or add agents to the listing of agents based on the assessment. In some embodiments, the listing may be updated periodically. For example, the listing may be updated at the time of a request for item 209, hourly, daily, weekly, or monthly. Frequent updates may help to ensure the listing of agents provided to the purchaser is current. In some embodiments, upon receipt of a purchase request, payment system 200 may dynamically assess agents qualified to participate in the purchase and may provide a listing of qualified agents that only includes agents qualified at the time of the transaction. For example, upon receiving the a request for an item (block 302) vendor 202 may query honorary payment facilitator 206 for an updated listing of qualified agents and, in response, honorary payment facilitator 206 may assess the listing of agents and provide to vendor 202 and/or purchaser 208 an updated listing of agents that are qualified at the time of the request.

An agent for making a purchaser payment to may be selected automatically by payment system 200, or purchaser 208 may select one or more agents to make the purchaser payment to. In some embodiments, purchaser 208 may select one or more of agents at the time of purchase. For example, in association with an honorary commitment to pay, purchaser 208 may select an agent from a displayed listing of qualified agents and/or select to make a payment to an agent that is not listed. In some embodiments, purchaser 208 may not be required to select an agent at the time of purchase, and may simply make a payment to one or more a qualified agent 204 without have to pre-select them.

In some embodiments, a request for an honorary commitment to pay for an item may include providing a timeframe for making a corresponding purchaser payment. For example, a request for an honorary commitment to pay for an item may request that purchaser 208 make an associated purchaser payment to agent 204 within one day, one week, or one month of purchase. In some embodiments, payment within the time frame may be required. For example, purchaser 208 may be penalized if the purchaser payment is not made to agent 204 within the required time frame. In some embodiments, the purchaser's account may be suspended or the purchaser may incur an additional fee if the purchaser payment is not made to the agent within the required time frame. In some embodiments, payment within the time frame may be optional, and, thus, the purchaser may not be re-assessed if the purchaser payment is not made to the agent within the time frame. In some embodiments, for instance, purchaser 208 may be allowed to make, without adverse consequences, a purchaser payment to agent 204 after the time frame has expired. In some embodiments, if the time frame has expired, prior to making the purchaser payment, purchaser 208 may simply be asked to revisit payment system 200 to provide a notification that the purchaser payment has not been made within the requested time frame. In some embodiments, the purchaser may be provided with an updated invoice that can be used when making payment to the agent. Such an embodiment may ensure that the associated transaction is in records of the payment system 200 prior to submission of the purchaser payment to an agent. Maintaining an active transaction may be beneficial where the issued invoice may expire after a given period for logistical purposes, such as instances where UPC's associated with the purchase are recycled, as described below with respect to FIGS. 7A-7C.

In the illustrated embodiment, method 300 includes an honorary commitment to pay, as depicted at block 306. In some embodiments, an honorary commitment to pay may include the purchaser providing, and the vendor or the honorary payment facilitator receiving, an indication of a purchaser's honorary commitment to provide a purchaser payment to an agent. For example, after vendor 202 or honorary payment facilitator 206 provides a request for an honorary commitment to pay for an item, as described with respect to block 304, purchaser 208 may provide an indication of their agreement to the terms and conditions of the request for an honorary commitment to pay (e.g., selecting a checkbox on a website indicating the honorary commitment to payment).

In some embodiments, an honorary commitment to pay includes a purchaser selecting an agent to make the purchaser payment to. For example, where purchaser 208 is provided with a listing of qualified agents, purchaser 208 may provide an indication of one or more agents 204 that purchaser 208 plans to provide the purchaser payment to. In some embodiments, the purchaser may be allowed to indicate payment to an agent not listed. For example, purchaser 208 may suggests that the purchaser be allowed to make payment to another agent, may suggests payment system 200 add another agent, and/or may select to make payment to an agent that was filtered out of the listing of agents. In such an embodiment, payment system 200 may assess and determine whether or not to allow payment to the suggested agent before continuing with the transaction. For example, honorary payment facilitator 206 may assess whether or not the selected agent is already a member of payment system 200 and/or whether or not the suggested agent is qualified to be included with payment system 200 before accepting the commitment to pay and/or transferring item 209.

In some embodiments, an honorary commitment to pay may include a commitment to pay a portion or all of the requested purchase payment. For example, in an embodiment in which the request for an honorary commitment to pay affords purchaser 208 the option to provide a purchase payment, purchaser 208 may commit to the terms and conditions of the request for an honorary commitment and may not actually commit to providing any purchase payment for item 209. In some embodiments, a purchaser payment may not be required where the purchaser is afforded an opportunity try the item before committing to a purchaser payment. For example, vendor 202 may provide the item and request that purchaser 208 make a payment only if they were satisfied with the item.

In some embodiments, an honorary commitment to pay may include an asymmetric promise. An asymmetric promise may include a promise to provide a purchaser payment in exchange for the agent providing an agent payment for a different amount. For example, a purchaser may commit to making a $25 payment to the agent in exchange for the agent immediately providing a $10 payment that can used to purchase items from system 200. In some embodiments, a retailer may provide credit for use on system 200 such that a purchaser does not have to provide complete payment for the goods. For example, a vendor/agent may offer $5 of credit to be used with system 200 in exchange for the purchase of two pizzas. Such promotional offers may give incentives for a purchaser to user a particular agent/vendor.

In the illustrated embodiment, method 300 includes transferring the item, as depicted at block 308. In some embodiments, transferring the item includes providing requested item 209 to purchaser 208. Transferring the item may include electronically transferring (e.g., downloading or e-mailing) the item to the facilitator or purchaser. For example, item 209 may be transferred to purchaser 208 via communications network 210 and/or computer system 100. In some embodiments, the item is transferred after an honorary commitment to pay by the purchaser and before a purchaser payment is provided to an agent. For example, vendor 202 may transfer item 209 to purchaser 208 only after receiving an honorary commitment to pay (block 306), but may not require that a purchaser payment be made prior to the transfer of item 209. In some embodiments, the item may be provided before, or even without, a request for payment and/or a payment commitment. In such an embodiment, vendor 202 may transfer the item to purchaser 208, simply trusting that purchaser 208 will provide the purchaser payment to agent 204. For example, vendor 202 may provides item 209 and simply requests that purchaser 208 make an honorary payment to agent 204 for an item if purchaser 208 is satisfied with item 209, and may not require an honorary commitment to pay prior to transfer of the item.

In the illustrated embodiment, method 300 includes providing invoice information, as depicted at block 310. In some embodiments, providing invoice information may include providing an invoice/receipt/slip associated with the transfer of the item. For example, vendor 202 may electronically transmit to purchaser 208, information that memorializes the transaction. In some embodiments, invoice information may be sent to the purchaser or otherwise be made available to the purchaser. For example, an invoice may be e-mailed to purchaser 208 and/or may be made accessible via a website upon transfer of item 209. In some embodiments, the invoice information may include identification of the purchaser, an account identifier associated with the purchaser, a transaction identifier, a payment amount, a date for payment, a vendor identifier, an agent identifier, or the like. In some embodiments, the invoice may include information, such as a bar code identifier (e.g., a UPC), as discussed below with respect to FIGS. 6A and 6B.

In some embodiments, the provided invoice information may be used to facilitate making a purchaser payment to an agent. For example, purchaser 208 may provide at least a copy of the invoice to agent 204 such that payment system 200 can properly credit the purchaser payment to purchaser 208 and associate the agent payment with the specific item 209. In some embodiments, the invoice information may be provided proximate the time of transferring the item. For example, the invoice information may be provided to purchaser 208 via electronic communication just before or after transfer of the item 209.

In some embodiments, the purchaser may be provided promotional material in association with the transaction. For example, promotional material, such as advertisements, coupons or the like, may be provided to purchaser 208. In some embodiments, promotional material may be provided along with the invoice information. For example, an invoice for the transaction may include a coupon or advertisement printed thereon, as discussed in more detail below with respect to FIGS. 6A and 6B.

In some embodiments, promotional material may be targeted to a specific retail merchant and/or product. For example, where the selected agent includes a convenience store, the invoice information may include a coupon for an item sold in the convenience store (e.g., buy one soft-drink, get one soft drink free). Accordingly, in addition to making a purchaser payment, purchaser 208 may be enticed to purchase items from the agent location 204 (e.g., at the convenience store).

In some embodiments, the promotional material may be dependent upon the purchaser payment. For example, purchaser 208 may be entitled to a free soft-drink upon making the purchase payment. Accordingly, the purchaser may be more likely to make the purchase payment in an attempt to receive the promotion. In some embodiments, the promotion may be dependent upon the quality of the purchase payment. For example, a first—higher value—promotion may be provided for timely payments and/or higher purchase payment amounts, and a second—lesser value—promotion may be provided for un-timely payments and/or lower purchase payment amounts. Accordingly, purchaser 208 may be enticed to provide larger purchase payments in a timely manner. Agents are likely to encourage such promotional material as it may increase customer traffic in the retail locations, thereby leading to an increased number of sales. In some embodiments, similar promotional material may be directed to other agents, merchants, vendors, and the like. For example, a promotion may include receiving a second electronically transmittable item for free or at a discount if a purchaser payment for electronically transmittable item 209 is provided.

In the illustrated embodiment, method 300 includes providing purchaser payment, as depicted at block 312. In some embodiments, a purchaser payment includes a purchaser providing a purchaser payment (e.g., a payment including the full promised amount of payment, more than the full promised amount of payment, or only a portion of the promised amount of payment) and an agent receiving the purchaser payment from the purchaser. For example, where agent 204 includes an individual (e.g., a family member) purchaser 208, or someone acting on the purchaser's behalf, may inform agent 204 of the purchase and provide agent 204 with at least a portion or all of the requested purchaser payment. Where agent 204 includes a retail merchant (e.g., a convenience store), purchaser 208, or someone acting on the purchaser's behalf, may make the purchase payment at a brick-and-mortar location of the retail merchant. In some embodiments, the purchaser payment may be made at a cash register or similar terminal used for making retail transactions. Accordingly, purchaser 208, or someone acting on the purchaser's behalf, may enter brick-and-mortar location of agent 204 to provide payment. In some embodiments, the purchase payment may be made to agent 204 in combination with other purchases made at the retail merchant location. For example, purchaser 208 may purchase several items at the brick-and-mortars retail location of agent 204 and may provide the purchaser payment in a single transaction/payment that includes the purchaser payment for item 209 and payment for the other items purchased at the brick-and-mortars location. As described above, in some embodiments, the purchase payment made accompanied by an invoice. For example, in some embodiments, a printed invoice may be provided to agent 204 along with the items purchased at the brick-and-mortar location.

In some embodiments, a purchaser may purchase a prepaid credit card using honorary credit. For example, purchaser 208 may provide a purchaser payment to an agent 204 in exchange for a prepaid credit card (or similar credit instrument) that enables the purchaser 208 to purchase items from vendor 202. Such an embodiment may enable a purchaser to provide secure payment (e.g., cash) to the agent, as opposed to having to open a line of credit (honorary or traditional credit) with vendor 202 or having to make a payment directly to vendor for the item. For example, purchaser 208 may purchase the credit instrument at a brick-and-mortars agent location, and use the credit instrument to purchase merchandise 209 from one or a plurality of vendors 202 of system 200.

In the illustrated embodiment, method 300 includes providing an agent payment, as depicted at block 314. In certain embodiments, the agent payment includes a payment made by an agent to an upstream component of payment system 200, such as a vendor or an honorary payment facilitator. In some embodiments, the agent payment may be made directly or indirectly to a vendor. For example, in some embodiments, where payment is made directly to vendor 202, agent 204 may provide all or a portion of an agent payment directly to vendor 202, as represented by line 214, 214a and 214b of FIGS. 2A and 2B. In some embodiments, payment system 200 may not include an honorary payment facilitator. In certain embodiments, functionality of honorary payment facilitator 206 may be integrated within vendor 202. For example, vendor 202 may include an entity that coordinates agent payments such that an additional intermediary is not required. In some embodiments, where payment is made indirectly to vendor 202, agent 204 may provide all or a portion of an agent payment to directly to honorary payment facilitator 206, as represented by lines 216, 216a and 216b, and honorary payment facilitator 206 may forward an associated vendor payment to vendor 202. In some embodiments, an indirect payment to vendor 202 may include a direct or indirect payment to an agent switch. For example, as depicted in FIG. 2B, an agent payment may be provided indirectly to vendor 202 or honorary payment facilitator via agent switch 220, as represented by lines 222a, 222b, 214c and 216c. In some embodiments, one or both of the agent payment and the vendor payment may be subject to commissions, such as those paid to the agent and/or the honorary payment facilitator, as described above.

In some embodiments, an agent payment is made after the agent receives the purchaser payment. For example, agent 204 (or someone acting on the agent's behalf) may wait to actually receive the purchaser payment before submitting the corresponding agent payment. In some embodiments, the agent may submit a corresponding agent payment for each purchaser payment received and/or the agent may submit two or more agent payments corresponding to two or more purchase payments together. For example, agent 204 may receive multiple purchaser payments from one or more purchasers and may submit periodically (e.g., daily) one or more agent payments corresponding to the purchaser payments received. For example, where agent 204 includes a retail merchant, several purchase payments may be made at one or more retail locations during a day. At the end of the business day, or at various intervals during the day, agent 204 may report each of the purchase payments to vendor 202, honorary payment facilitator 206, and/or agent switch 220, and may provide a single lump-sum agent payment or multiple agent payments (e.g., one for each corresponding purchase payment) that correspond to the purchase payments made during that day. In one embodiment, agent switch 220 makes an agent payment on behalf of agents 204c and 204d. For example, where agent switch 220 includes a financial headquarters of agent 204c and 204d, agent switch 220 may collect purchase payment information from agents 204c and 204d, and agent switch 220 may provide a corresponding agent payment to vendor 202 and/or honorary payment facilitator 206. Such periodic agent payments and reporting system may help to reduce communication traffic between components of payment system 200. Where multiple purchaser payments are provided in a single transaction, the agent may provide a single-consolidated agent payment that covers the multiple purchase payments made in the single transaction. Such a consolidated payment may enable an agent to more efficiently handle multiple purchase payments by submitting only a single consolidated agent payment for multiple purchase payments.

In some embodiments, an agent payment is made before the agent receives the purchaser payment. For example, where agent 204 includes an individual, such as a family member, the agent may proceed to make the agent payment before receiving or even securing the corresponding purchaser payment from purchaser 208. Agent payments made before a corresponding purchaser payment may be more prevalent where a trust is established between the purchaser and the agent. For example, where agent 204 is parent or a family member, agent 204 may receive notice of the purchase, and acting as the agent, provide the agent payment, trusting that they will receive the purchaser payment from purchaser 208 and/or not expecting the purchaser 208 to actually make the purchaser payment. In other words, the agent themselves essentially provides the purchase payment and the agent payment. This may be the case where parents assume the role of agents for their child, and trust the child will provide the purchaser payment, and/or decide to make the purchaser payment and agent payment on behalf of the child without requiring that the child repay them.

In the illustrated embodiment, method 300 includes providing a vendor payment, as depicted at block 316. In some embodiments, making a vendor payment includes an honorary payment facilitator or agent providing a payment corresponding to one or more purchaser payments. For example, honorary payment facilitator 206 may directly or indirectly provide the vendor payment to vendor 202. In an embodiment that does not include honorary payment facilitator 206, such as embodiment in which functionality of honorary payment facilitator 206 is provided by or otherwise integrated within vendor 202, an agent payment may be provided from agent 204 to vendor 202 as there is no intermediary component of payment system 200.

In some embodiments, honorary payment facilitator 206 does not provide all or even a portion of the vendor payment to vendor 202 until the purchaser payment and/or the agent payment in received. For example, honorary payment facilitator 206 may wait to receive an indication from agent 204 that the purchaser payment has been initiated/received and/or may wait until the agent payment from agent 204 has been initiated/received, before sending a corresponding vendor payment and/or authorizing agent 204 to send a corresponding vendor payment to vendor 202. In such an embodiment, vendor 202 may extend honorary credit to the purchaser for the purchase of the item until vendor payment is made to vendor 202. Honorary credit may include providing an item to a purchaser in exchange for an honorary commitment (e.g., a non-legally binding commitment) by the purchaser, or someone acting on the purchaser's behalf, to provide payment to an agent for purchase of the electronically transmittable item at a later time.

In some embodiments, honorary payment facilitator 206 provides all or at least a portion of the vendor payment to vendor 202 prior to the purchaser payment being initiated and/or received by agent 204. For example, at the time of purchase, honorary payment facilitator 206 may forward all or at least a portion of the vendor payment to vendor 202 at or near the time of the transfer of item 209 (e.g., when the request for an item is provided, when the purchaser provides an honorary commitment, or when the item is provided to the purchaser), and before the purchaser payment and/or the agent payment is initiated and/or received. In one embodiment the honorary payment facilitator may provide a portion of the vendor payment at or near the time of the transaction, and may wait to receive an indication from agent that the purchaser payment has been initiated/received and/or wait until the agent payment has been initiated/received before sending the remainder of the corresponding vendor payment and/or authorizing the agent to send the remainder of the corresponding vendor payment to the vendor. In such an embodiment, honorary payment facilitator 206 may operate to extend honorary credit to purchaser 208 in the amount of the vendor payment at or near the time of the transfer of item 209. Similarly, vendor 202 may extend honorary credit to the purchaser for at least a portion of the vendor payment withheld by honorary payment facilitator 206 at or near the time of the transfer of item 209.

In the illustrated embodiment, method 300 includes crediting a purchaser, as depicted at block 318. In some embodiments, crediting a purchaser includes providing a credit to an account associated with the purchaser, wherein the credit is indicative of the purchaser payment. For example, in one embodiment, vendor 202 and/or payment facilitator 206 may update an account associated with purchaser 208 to reflect the purchaser payment. In some embodiments, crediting the purchaser may be provided at the time of receiving the purchaser payment. For example, agent 204 may provide an indication to vendor 202 and/or honorary payment facilitator 206 that a purchaser payment has been received, and a corresponding credit may be provided to the purchaser's account before or after a corresponding agent or vendor payment. In some embodiments, credit to purchaser may be issued only after a corresponding agent payment or vendor payment is provided.

In some embodiments, crediting a purchaser may include providing credits to the purchaser's account in the amount of the purchase payment. In some embodiments, credits to the purchaser may include updating other indices related to the purchaser. For example, purchaser incentive (e.g., points redeemable for merchandise) may be updated and/or a purchaser's credit worthiness may be updated, as described in more detail below with respect to FIGS. 4A and 4B.

In some embodiments, receipt of a good may be cancelled or suspended based on whether or not a purchaser provided a payment. In the case of subscription goods (e.g., services, magazines, or the like), the good/service may be provided based on an honorary commitment to pay, however, the subscription to the good/service may be cancelled or suspended if the honorary commitment to pay is not met. For example, in some embodiments, purchaser 208 may provide an honorary commitment to pay for an anti-virus protection software/service to be executed on their computer 100, and based on the honorary commitment, vendor 202 may provide the anti-virus software/service to the purchaser. After a given period of time (e.g., one month later), vendor 202 may assess whether or not the honorary commitment has been met by the purchaser (e.g., whether or not the purchaser has made the payment). If the terms of the honorary commitment to pay have been met, the subscription to the service may be continued; however, if the honorary commitment to pay has not been met, use of the software/service may be reduced, suspended, or terminated. Vendor 202 may give purchaser 208 an opportunity to remedy the failure to meet the commitment, and may reinstate the good/service upon purchaser 208 satisfaction of the honorary commitment. A similar technique may be employed with magazine, newspapers, or similar subscription goods and services.

In some embodiments, a reminder to pay may be provided to a purchaser. For example, after receiving an honorary commitment to pay system 200 may send periodic reminders to purchaser 208 if a sufficient honorary payment has not been received. In some embodiments, a reminder may be automatically sent to a purchaser at a regular interval, such as once a week, until the purchaser payment is provided.

It will be appreciated that embodiments described with respect to FIG. 3 are illustrative and are not intended to be limiting. For example, certain steps described with respect to method 300 may be rearranged, removed, or duplicated. In one such embodiment, providing an invoice (block 310) may be provided prior to transfer of the item (block 308). Moreover embodiments of method 300 may include techniques described above, as well as techniques described in more detail below. For example, crediting a purchaser (block 318) may include scoring a transaction as described in more detail below with respect to FIG. 4A-4C, conducting a transaction using method 300 may be based on embodiments including incentives, such as those described in more detail below with respect to FIG. 5B, and/or providing an invoice (block 310) in accordance with embodiments described with respect to FIGS. 6A-7C.

In certain transactions, it may be useful to assess and determine honorary credit worthiness of a prospective purchaser prior to extending honorary credit. For example, a vendor may want to assess how likely it is that a potential purchaser is going to follow through on an honorary commitment to pay for an item prior to extending honorary credit to the prospective purchaser. In some embodiments, a vendor may decide to accept or decline a request for an item based on the creditworthiness of the purchaser requesting the item. For example, if the purchaser is associated with high credit worthiness, the vendor may extend honorary credit, providing the item to the purchaser in exchange for an honorary commitment to pay. If, however, the purchaser is associated with low credit worthiness, the vendor may decline to extend honorary credit to the purchaser, instead requiring pre-payment or some other commitment to providing payment before providing the item to the purchaser.

In some embodiments, an honorary credit worthiness associated with a purchaser may be based on certain characteristics of the purchaser or similar types of purchasers. For example, credit worthiness may be based on assessments of prior transactions by the respective purchaser or may be based on prior transactions of other purchasers (e.g., trending data used to predict an outcome of the transaction). In some embodiments, information associated with credit worthiness may be gathered during prior transactions. For example, credit worthiness may be assessed/updated for a purchaser after a purchaser payment is received (or not received) as a result of an honorary credit based transaction.

Figure 4A:
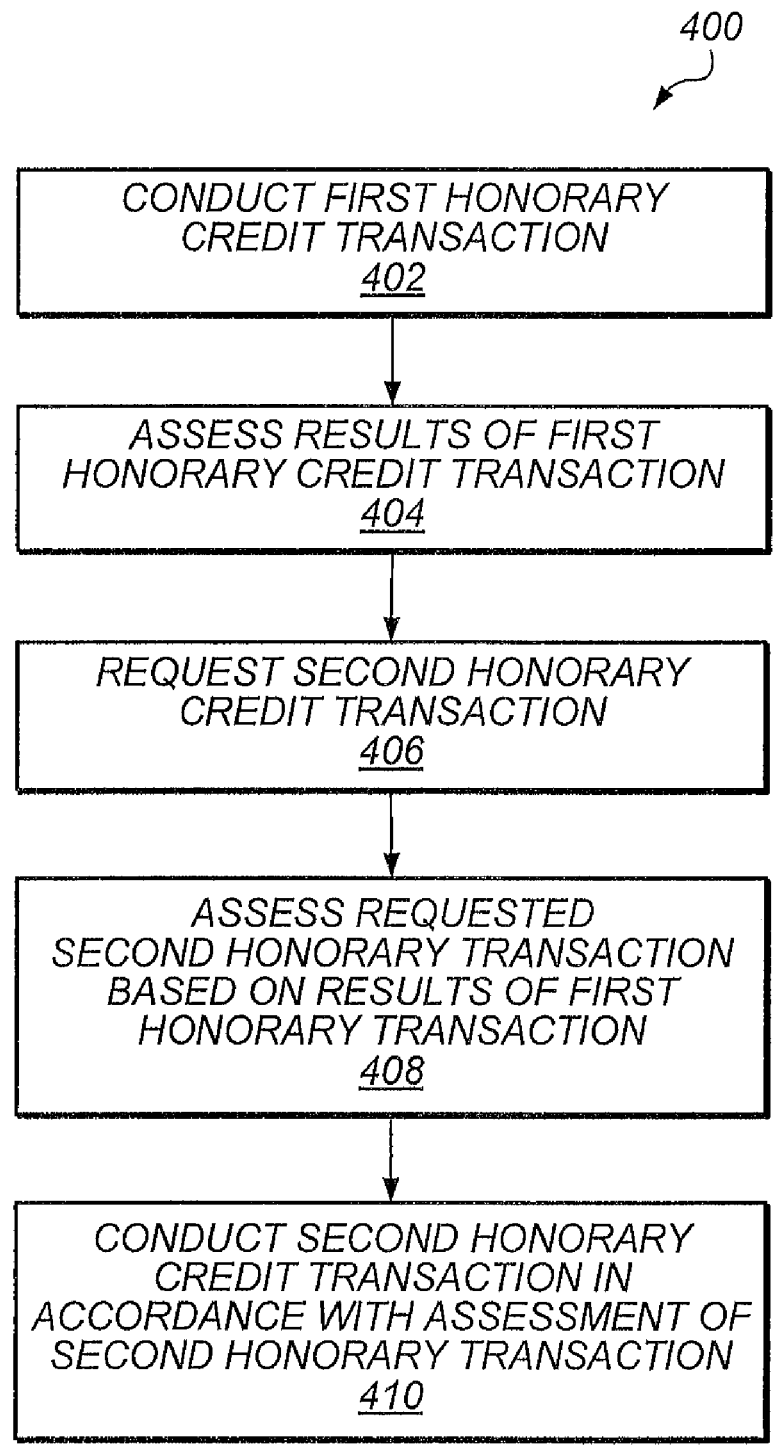
FIG. 4A is a flowchart that illustrates a method of implementing an "honorary" e credit worthiness assessment in association with an honorary credit based transaction, in accordance with one or more embodiments of the present technique.

FIG. 4A is a flowchart that illustrates a method 400 of implementing a credit worthiness assessment in association with an honorary credit based transaction, in accordance with one or more embodiments of the present technique. Method 400 generally includes conducting a first honorary credit transaction, scoring the first honorary credit transaction, requesting a second honorary transaction, assessing the second honorary credit transaction based on a score of the first honorary transaction and conducting the second honorary credit transaction in accordance with the assessment. In some embodiments, for example, a purchaser may have a credit worthiness score associated with them based on the results of one or more prior honorary credit transactions. When the purchaser requests a second honorary transaction, a vendor may assess whether or not to conduct the second honorary credit based transaction, or how to conduct the honorary based transaction based on the assessment. For example, where the purchaser is associated with a high credit score indicative of credit worthiness and/or a high likelihood of making a purchaser payment, the vendor may continue with the second honorary transaction. Where the purchaser is associated with a low credit score indicative of low credit worthiness and/or a low likelihood of making a purchaser payment, the vendor may not extend honorary credit, and may this refuse to complete the second honorary transaction.

In the illustrated embodiment, method 400 includes conducting a first honorary credit transaction, as depicted at block 402. In some embodiments, conducting a first honorary credit transaction may include conducting a transaction in accordance with method 300 as described above with respect to FIG. 3. For example, conducting a first honorary credit transaction may include purchaser 208 requesting electronically transferable item 209 from an internet vendor 202, vendor 202 may request at least an honorary commitment to payment from purchaser 208, purchaser 208 may provide an honorary commit to make a payment to agent 204 in exchange for item 209, vendor 202 may provide item 209 to purchaser 208 via electronic communications network 210, purchaser 208 may provide a purchaser payment to agent 204, agent 204 may forward a corresponding agent payment to honorary payment facilitator 206 and/or vendor 202, and/or honorary payment facilitator 206 may forward a corresponding vendor payment to vendor 202.

In the illustrated embodiment, method 400 includes assessing results of the first honorary credit transaction, as depicted at block 404. In some embodiments, assessing results the first honorary credit transaction may include assessing one or more aspects of the honorary credit transaction, and providing resulting information indicative of how the honorary credit transaction was conducted. For example, an assessment may include assessment of whether or not the purchaser payment was provided in accordance with the terms and condition committed to by purchaser 208. In some embodiments an assessment may include an assessment of an amount of the purchaser payment, and/or whether or not the purchaser payment was timely.

In some embodiments, assessing results of the first honorary transaction comprises providing a score indicative of one or more aspects of how the first honorary transaction was conducted. In some embodiments, a score may include a numerical value. For example, a transaction may be assessed a value between zero and ten, with zero being unsatisfactory and ten be excellent. In some embodiments, a score may be grouped within discrete ranges, such as ranges of 100-200, 201-300, 301-400, 401-500 and so forth. In such an embodiment, each range may be associated with a given level of creditworthiness. For example, a credit worthiness score in the range 100-200 may be indicative of a lower credit worthiness that a score in the range of 201-300. In some embodiments, a score may include other forms of indices. For example, a score may alphabetic values (e.g., A, B, C) include textual comments and the like that can be reviewed.

In some embodiments, such a score is indicative or one or more aspects of the transaction. For example, a single score may be provided based on the amount or the timeliness of the purchaser payment. In some embodiments, a score may be provided based on two or more aspects of the transaction. For example, a score may include a single value indicative of both an amount of a purchaser payment and the timeliness of the purchaser payment. In some embodiments, a score may include combining a score of the current transaction with one or more other scores. For example, one or more scores from the current transaction may be combined with prior scores associated with the purchaser to provide a cumulative score. For example, a cumulative score may include an average of scores received from two or more transactions.

In the illustrated embodiment, method 400 includes requesting a second honorary credit transaction, as depicted at block 406. In some embodiments, requesting a second transaction may include purchaser of the first transaction requesting to conduct a second honorary credit transaction. For example, purchaser 208 may request item 209 from vendor 202 as described above with respect to block 302 of method 300. The request for a second honorary credit transaction may include a request being made to the same vendor associated with the first honorary credit transaction or a vendor different from the vendor associated with the first honorary credit transaction.

In the illustrated embodiment, method 400 includes assessing the requested second honorary transaction based on the results of the first honorary transaction, as depicted at block 406. In some embodiments, assessing the requested second honorary transaction based on the results of the first honorary transaction includes a vendor and/or an honorary payment facilitator assessing a score associated with the purchaser to determine whether or not continue the second honorary credit transaction and/or how to conduct the transaction.

In the illustrated embodiment, method 400 includes conducting the second honorary credit transaction in accordance with assessment of a second honorary transaction, as depicted at block 410. For example, a composite score associated with purchaser 208 may be compared to a threshold value, and if the composite score satisfies the threshold value (e.g., meets of exceeds a minimum value), the transaction may be completed. The transaction may include the vendor providing the requested item to the purchaser in exchange for an honorary commit by the purchaser to provide a purchaser payment to an agent. For example, where purchaser 208 is associated with a high credit score indicative of credit worthiness and/or a high likelihood of making a purchaser payment, vendor 202 may continue with the second honorary transaction, providing item 209 to purchaser 208 in exchange for an honorary commitment for payment. However, if the composite score does not satisfy the threshold value (e.g., does not meet or exceed a minimum value), the transaction may be not be completed and/or the vendor may require at least a complete pre-payment or partial pre-payment for the item before providing the requested item to purchaser 208. For example, where purchaser 208 is associated with a low credit score indicative of low credit worthiness and/or a low likelihood of making a purchaser payment, vendor 202 may not extend honorary credit, instead, requiring a pre-payment prior to providing item 209, or may this refuse to complete the second honorary transaction.

In some embodiments, various characteristics of the transaction may be assessed/determined based on the assessment of the credit transaction. For example, if the composite score is high, more opportunities may be afforded to the purchaser (e.g., higher limits, better offers, more promotional discounts, etc.) Conversely, if the composite score is low, the purchaser may be afforded less opportunities (e.g., lower limits, reduced offers, and less promotional discounts).

In some embodiments, assessments/determinations may vary from vendor to vendor. For example, one vendor may allow a transaction based on a composite score, whereas another vendor may not. Vendors may have varying thresholds/standards for the assessment of transactions.

In some embodiments, a threshold level for an honorary credit worthiness score may be based on a default score. For example, where a purchaser does not have much or any credit history (e.g., no prior honorary transactions), a default credit worthiness score may be associated with the user. In some embodiments the default credit worthiness score may be adjusted based on various demographics (e.g., location, age, past banking credit history).

In some embodiments, an honorary credit worthiness score may be adjusted based on one or more factors. For example, a credit worthiness score for a purchaser may be adjusted based on IP address/machine ID associated with the purchaser, a time of day for the transaction, a social relationship (e.g., friend's and relative's scores), historical payment schedule associated with the purchaser, means of remittance, patterns of remittance, a score associated with a publisher of the credit worthiness score, and/or who the publisher is.

Figure 4B:
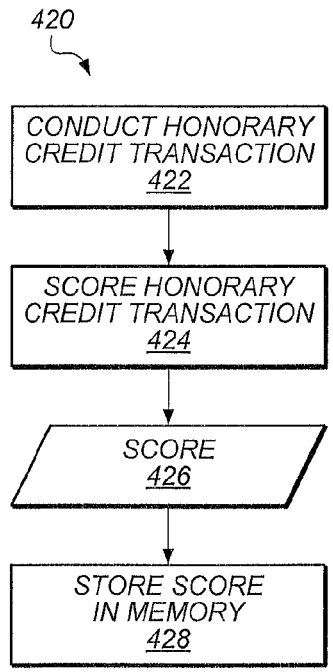
FIG. 4B is a flowchart that illustrates a method of providing and storing an honorary credit worthiness score, in accordance with one or more embodiments of the present technique.

FIG. 4B is a flowchart that illustrates a method 420 of providing and storing a credit worthiness score, in accordance with one or more embodiments of the present technique. In the illustrated embodiment, method 420 includes conducting an honorary credit transaction, as depicted at block 422. In some embodiments, conducting an honorary credit transaction may include one or more techniques similar to conducting a first honorary credit transaction, as depicted and described with respect to method 300 of FIG. 3 and block 402 of FIG. 4A. In the illustrated embodiment, method 420 includes scoring an honorary credit transaction, as depicted at block 424. Scoring an honorary credit transaction may include one or more techniques similar to assessing results of a first honorary credit transaction, as depicted and described with respect to block 404 of FIG. 4A. For example, in some embodiments, scoring an honorary transaction may include providing a score 426 (e.g., a transaction score) indicative of one or more aspects of how the previous/first honorary transaction was conducted. In the illustrated embodiment, method 420 includes storing a score in a memory, as depicted at block 424. In some embodiments, storing a score in a memory includes storing one or more scores 426 in a memory accessible by payment system 200. For example, in some embodiments, score 426 maybe stored in a memory of vendor 202, a memory of honorary payment facilitator 206, and/or an memory external to payment system 200. In some embodiments, score may be stored in a memory location such that it can be retrieved by vendor 202 and/or honorary payment facilitator 206 to assess and determine credit worthiness of purchaser 208 in response to a request for an item and/or honorary credit by purchaser 208.

Figure 4C:
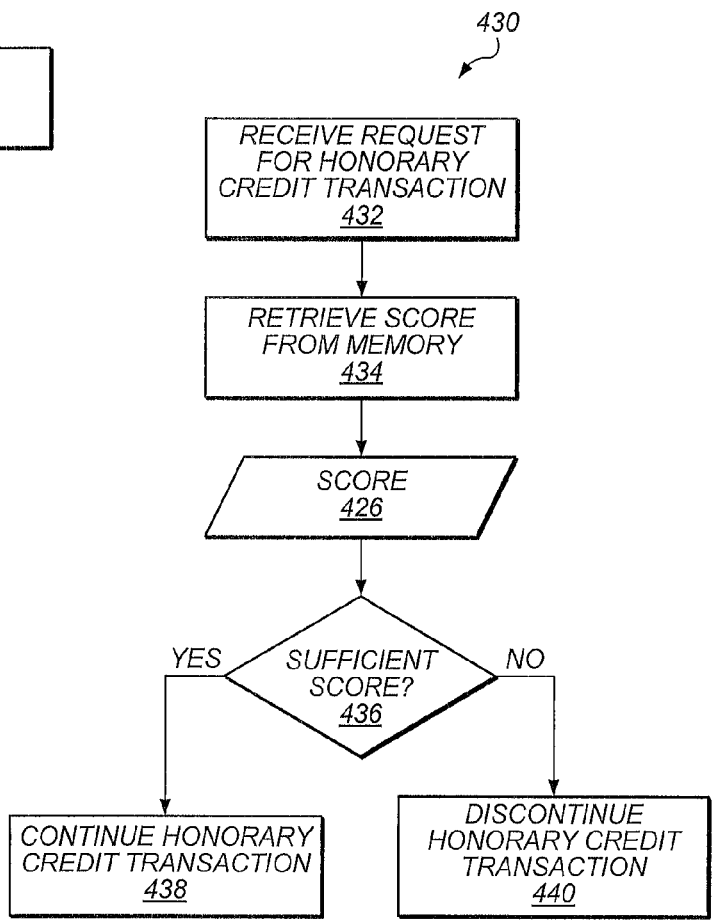
FIG. 4C is a flowchart that illustrates a method of using an honorary credit worthiness score, in accordance with one or more embodiments of the present technique.

FIG. 4C is a flowchart that illustrates a method 430 of using a score, in accordance with one or more embodiments of the present technique. In some embodiments, using a score includes determining whether or not to continue with a requested honorary credit based transaction based on the assessment of the score. In the illustrated embodiment, method 430 includes receiving a request for an honorary credit transaction, as depicted at block 432. Receiving a request for an honorary credit transaction may include techniques similar to those described above with respect to block 302 of FIG. 3 and 406 of FIG. 4A. In the illustrated embodiment, method 430 includes retrieving a score from memory, as depicted at block 434. In some embodiments, retrieving a score from memory may include vendor 202 and/or honorary payment facilitator 206 retrieving score 426 stored in a memory as described with respect to block 428 of FIG. 4B. For example, in one embodiment, vendor 202 and/or honorary payment facilitator 206 may retrieve score 428 for use in assessing whether or not to conduct the requested honorary credit transaction. In the illustrated embodiment, method 430 includes assessing whether or not a score is sufficient, as depicted at block 436. In some embodiments, assessing whether or not a score is sufficient may include implementing one or more techniques similar to those described with respect to block 408 of FIG. 4A. For example, the retrieved score 426 may be compared to a threshold value to determine whether or not to fulfill the requested honorary credit based transaction. For example, score 426 may be compared to a threshold value, and if the score satisfies the threshold value (e.g., meets of exceeds a minimum value), the honorary credit transaction may continue, as depicted at block 438. Thus, the transaction may include vendor 202 providing item 209 to purchaser 208 in exchange for an honorary commit by purchaser 208 to provide a purchaser payment to agent 204. However, if the composite score does not satisfy the threshold value (e.g., does not meet or exceed a minimum value), the transaction may be discontinued, as depicted at block 440. For example, the honorary credit based transaction may not be completed and/or vendor 202 may require at least a complete pre-payment or partial pre-payment before providing item 209 to purchaser 208.

In some embodiments, one or more purchasers may be referred to a vendor or honorary payment facilitator. Referring a purchaser may include one person requesting that honorary credit be extended to another person. For example, in some embodiments, a party (e.g., purchaser 208) who already has a transaction history with payment system 200 may recommend/sponsor/nominate a prospective purchaser who does not have a transaction history with payment system 200, to receive honorary credit from payment system 200. In some embodiments, the party recommending the prospective purchaser may be held accountable for subsequent transactions including credit extended to the prospective purchaser. For example, the party may receive rewards/incentives (e.g., credits redeemable for merchandise) for positive honorary credit transactions conducted by the prospective purchaser (e.g., full purchaser payments), and may be penalized (e.g., have their credit worthiness score negatively impacted) for negative honorary credit transactions conducted by the prospective purchaser (e.g., failing to make a purchaser payment). Such a relationship may provide incentive for parties associated with payment system 200 to recommend responsible, creditworthy parties to use payment system 200, thereby helping to expand responsible use of payment system 200.

Figure 5A:
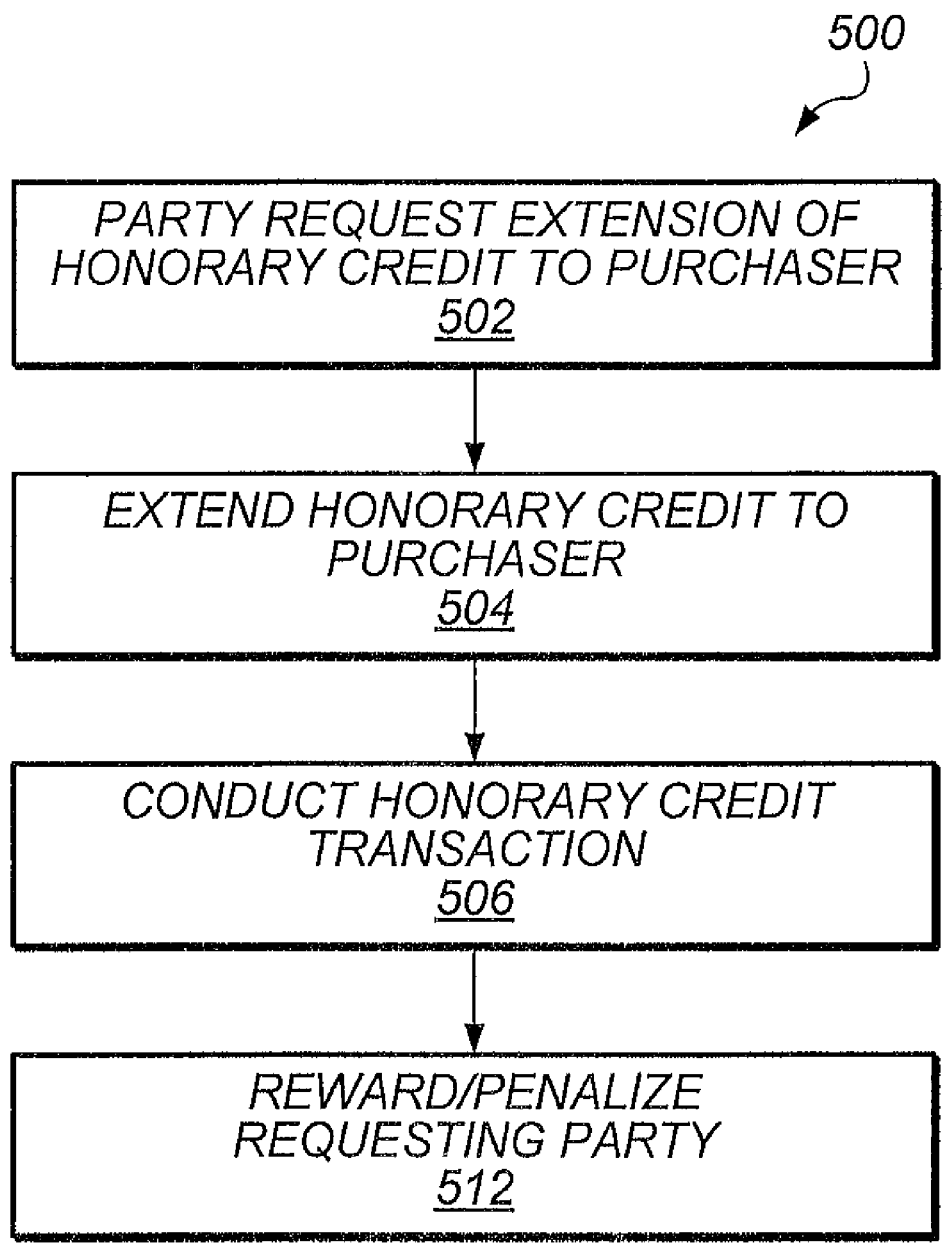
FIG. 5A is a flowchart that illustrates a method of conducting an honorary credit based transaction based on a referral in accordance with one or more embodiments of the present technique.

FIG. 5A is a flowchart that illustrates a method 500 of conducting an honorary credit based transaction based on a referral, in accordance with one or more embodiments of the present technique. Method 500 generally includes a party requesting an extension of honorary credit to a purchaser, extending honorary credit to a purchaser, conducting an honorary credit transaction, and rewarding and/or dis-incenting the requesting party. In the illustrated embodiment, method 500 includes a party requesting an extension of honorary credit to a purchaser, as depicted at block 502. In one embodiment, a party requesting an extension of honorary credit to a purchaser may include receiving a request from a first party to provide a second party with honorary credit in exchange for an honorary commitment by the second party to provide payment for an electronically transmittable item to one or more agents. For example, a first party having a transaction history (e.g., a purchaser 208 that has completed one or more transactions using payment system 200) may recommend/sponsor/nominate an extension of honorary credit to a prospective purchaser who does not have a transaction history with payment system 200. Such a request may be initiated by a purchaser who is vouching for a friend whom they think is responsible and should receive honorary credit from payment system 200. In some embodiments, such a request may be conditioned on the requesting party accepting accountability for honorary transactions conducted by the prospective purchaser. For example, the requesting party may be subject to incentive/rewards associated with positive honorary transactions conducted by the prospective purchaser, and may be subject to penalties associated with negative honorary transactions conducted by the prospective purchaser. In some embodiments, the requesting party may be provided incentive/rewards for simply providing a recommendation. Incentives/rewards may include credits redeemable for items, monetary payments, coupons, or incentives for requesting the prospective purchaser. Dis-incentives may include reductions in credits redeemable for items, monetary fees/penalties, reductions in the party's credit worthiness scores, loss of honorary credit, and the like.

In some embodiments, payment system may assess the request to determine whether or not to extend honorary credit to the prospective purchaser. In some embodiments, the determination may be based on past dealing with the requesting party. For example, where the requesting party has a high credit worthiness score, payment system 200 may extend honorary credit in accordance with the request. Where the requesting party has a low credit worthiness score, payment system 200 may refuse to extend honorary credit in accordance with the request. Where payment system 200 refuses to extend credit in accordance with the request, payment system 200 may notify the requesting party and the prospective purchaser that the honorary credit transaction is denied. Wherein payment system 200 affirms the request, payment system 200 may extend honorary credit to the purchaser 504, as depicted at block 504. For example, vendor 202 may provide the prospective purchaser with item 209 in exchange for an honorary commitment to provide a purchaser payment for an electronically transmittable item to agent 204. Having extended honorary credit to the prospective purchaser (now referred to as purchaser 208), an honorary credit transaction maybe conducted, as depicted at block 506. In some embodiments conducting an honorary credit transaction may include an honorary credit transaction such as that described herein (e.g., with respect to FIG. 3).

In the illustrated embodiment, method 500 includes rewarding/penalizing the requesting party, as depicted at block 512. In some embodiments, the requesting party may be provided incentives/rewards for positive transactions conducted by the purchaser 208. For example, where purchaser 208 completes transactions in a timely manner and/or provides a sufficient purchaser payment, the requesting party may receive incentives/rewards such as credits redeemable for items, monetary payments, coupons, or the like. In some embodiments, the requesting party may be sanctioned for negative transactions conducted by purchaser 208. For example, where purchaser 208 does not complete transactions in a timely manner and/or does not provides a sufficient purchaser payment, the requesting party may be re-assessed through reductions in credits redeemable for items, monetary charges, reductions in the party's credit worthiness scores, loss of honorary credit, and the like.

Figure 5B:
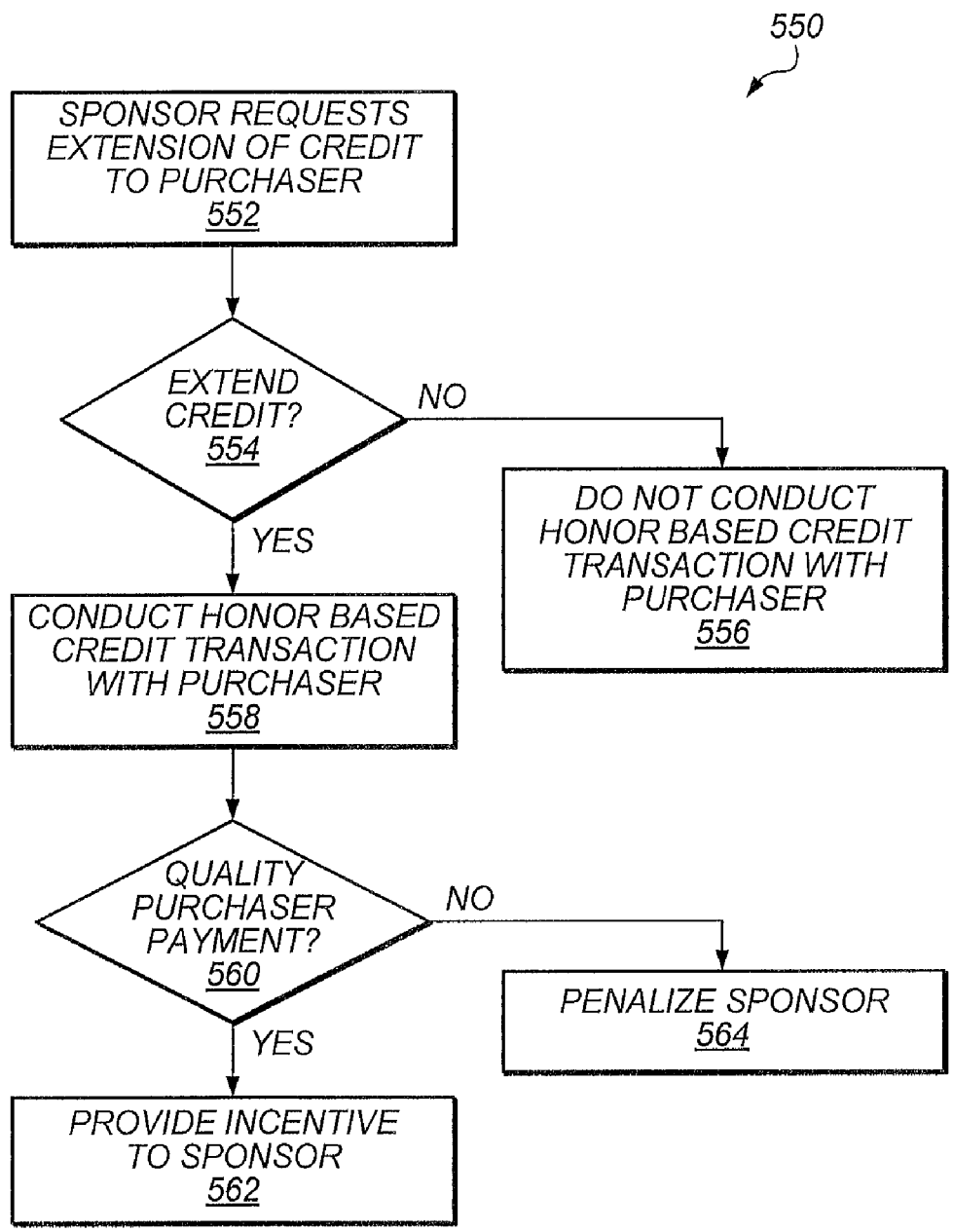
FIG. 5B is a flowchart that illustrates a method providing penalties/incentives as a result of a request for an extension of credit to a purchaser in accordance with one or more embodiments of the present technique.

FIG. 5B is a flowchart that illustrates a method 550 providing disincentives/incentives as a result of a request for an extension of credit to a purchaser, in accordance with one or more embodiments of the present technique. In the illustrated embodiment, method 550 includes a sponsor requesting extension of credit to a purchaser, as depicted at block 552. For example, a purchaser having prior transactions using payment system 200 may sponsor/recommend/requests honorary credit be extended to a prospective purchaser. After receiving the request, a decision is made whether or not to extend credit in accordance with the request, as depicted at block 554. For example, payment system 200 (e.g., vendor 202 and/or honorary payment facilitator 206) may assesses various factors to determine whether or not to extend honorary credit to the prospective purchaser. If it is determined that credit should not be extended in accordance with the request, method 550 includes not conducting the honor based credit transaction with the purchaser, as depicted at block 556. For example, the prospective purchaser may be asked to provide pre-payment for item 209, as opposed to receiving honorary credit for the full purchase price of the item 209. If it is determined that credit should be extended in accordance with the request, method 550 includes conducting the honor based credit transaction with the purchaser, as depicted at block 558. For example, an honorary based credit transaction with the prospective purchaser may be completed described herein (e.g., with respect to FIG. 3). After the honorary credit based transaction has been conducted, method 500 includes determining whether or not a quality purchaser payment was provided, as depicted at block 560. For example, payment system 200 may assess one or more factors including whether or not the purchaser payment was provided at all, whether it was provided to the appropriate agent, whether or not it was of a sufficient amount, whether or not it was made in a timely manner, or the like. If it is determined that a quality purchaser payment was provided, the sponsor may be provided with an incentive, as depicted at block 562. If it is determined that a quality purchaser payment was not provided, the sponsor may not be provided an incentive, and may be re-assessed, as depicted at block 564.

Although method 500 has been described with reference to FIG. 3, it will be appreciated that other techniques described herein may be incorporated into method 500. For example, one or more portions of method 500 maybe combined with one or more portions of method 400 of implementing a credit worthiness assessment in association with an honorary credit based transaction, in accordance with one or more embodiments of the present technique. For example, the quality of a transaction/payment may be assessed in a similar manner to that described with respect to block 404 of FIG. 4A and 424 of FIG. 4B.

In certain embodiments, it may be beneficial to provide a record of a transaction, such as an invoice and/or a receipt. For example, an invoice may be provided to a purchaser to document receipt of an item, and/or to provide information relating to providing payment for an item received. In some embodiments, an invoice may include an electronic copy or a hard copy (e.g., paper copy) of a document that includes information relevant to providing a purchaser payment for an item. For example, an invoice for a purchaser payment may be provided to a purchaser as described with respect to block 310 of method 300 in FIG. 3. In some embodiments, a printed hard copy of the invoice may be presented to an agent to facilitate making the purchaser payment.

Figure 6A:
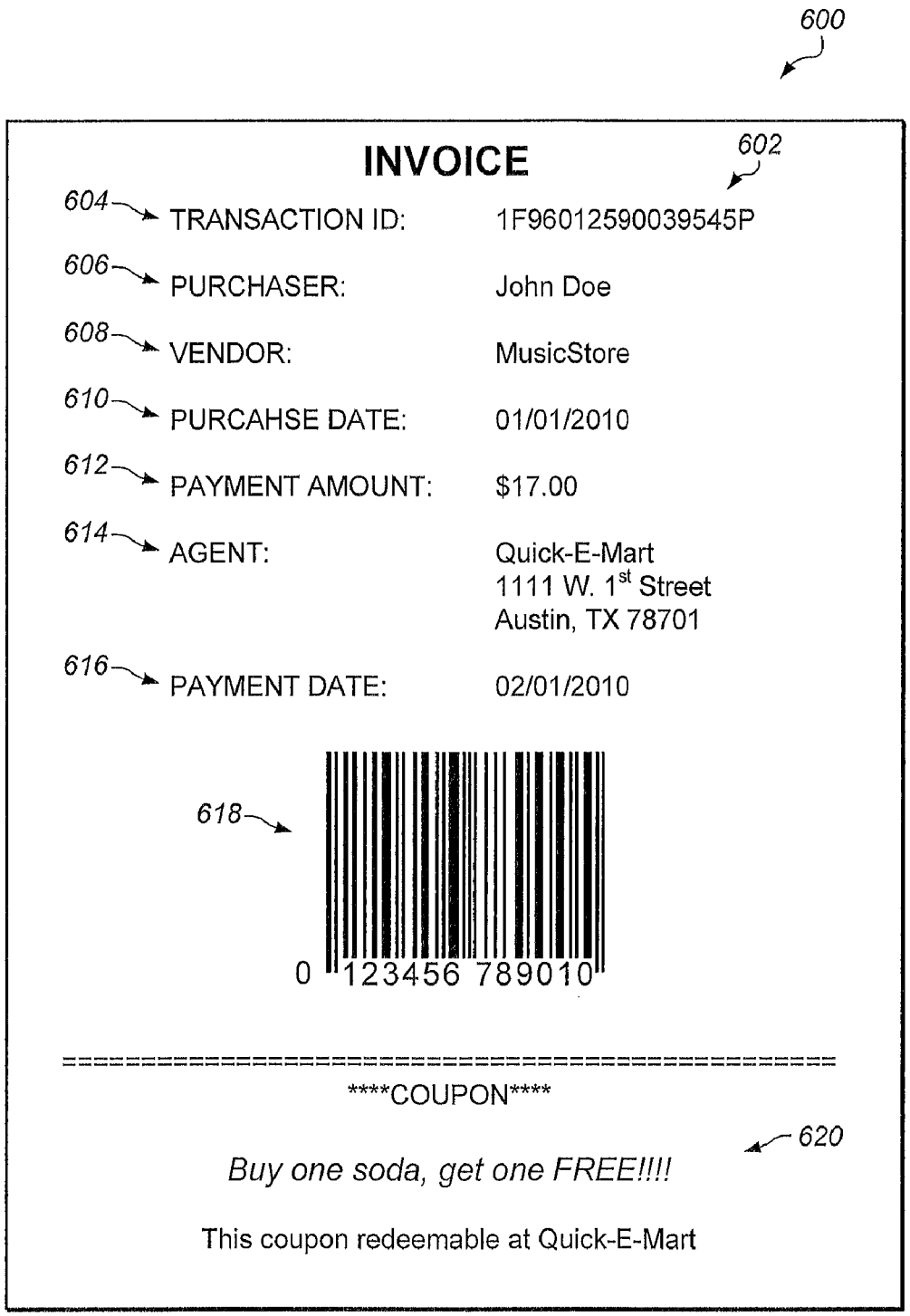
FIGS. 6A and 6B illustrate invoices in accordance with one or more embodiments of the present technique.
Figure 6B:
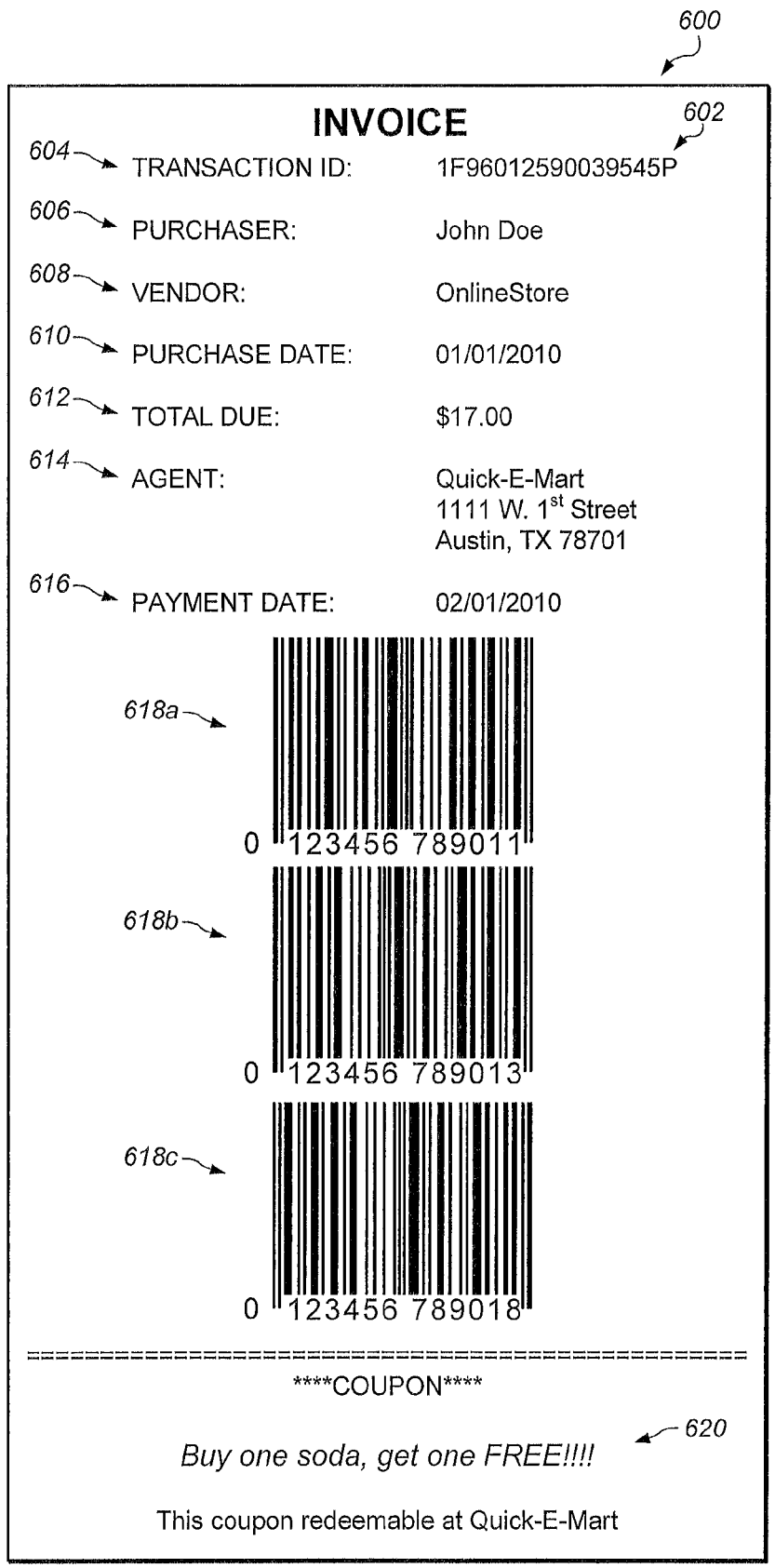

FIGS. 6A and 6B illustrate an invoice 600 in accordance with one or more embodiments of the present technique. Invoice 600 may include an invoice issued in association with an honorary credit based transaction or other transactions. In the illustrated embodiment, invoice 600 includes transactional information 602 including a transaction identifier (ID) 604, a purchaser ID 606, a vendor ID 608, a purchase date 610, a payment amount 612, an agent ID 614, a payment date 616, and a barcode (e.g., UPC) 618. In some embodiments, invoice 600 includes and a promotional information 620, as depicted.

In some embodiments, transaction ID 604 may include a unique identifier associated with the honorary credit based transaction or other transactions. For example, in the illustrated embodiment, the transaction ID includes a series of alpha-numeric digits that are unique to the respective honorary based credit transaction. In some embodiments, the transaction ID 604 may be referenced by various portions of payment system 200 to facilitate the honorary credit based transaction. For example, purchaser 208 may provide transaction ID to a vendor website to retrieve information associated with the transaction, such as whether or not agent 204 has reported an associated purchase payment.

Purchaser ID 606 may include an identifier of purchaser 208. For example, purchaser ID 606 may include the name (e.g., legal name or screen-name) associated with purchaser 208. Vendor ID 608 may include an identifier of vendor 202. For example, vendor ID 608 may include the name (e.g., legal entity, website name, and/or website address) associated with vendor 202. Purchase date 610 may include the date of a request for an item and/or the date for receipt of the item. For example, the purchase date may include a date/time when purchaser 208 submitted a request for an electronically transmittable item, and/or the date/time when the electronically transmittable item was received (e.g., downloaded or e-mailed). Payment amount 612 may include a listing of a requested amount to be paid for receipt of the item. For example, payment amount 612 may include an amount equal to a purchaser payment requested by vendor 202 and/or honorary payment facilitator 206. In some embodiments, payment amount 612 may include an amount requested for a single item or a total payment amount requested for a plurality of items. Payment date 616 may include a due date for a corresponding purchaser payment. For example, payment date 616 may include a required date for a purchaser payment or an optional/requested date for the purchaser payment. In some embodiments, invoice 600 may be valid until the payment date. In such an embodiment, invoice 600 may expire after the payment date 616, and purchaser 208 may need to obtain a new invoice. Barcode 618 may include a UPC or similar marking. In some embodiments, barcode 618 may be scanned by agent 204 to assess and determine various characteristics of the transaction. For example, barcode 618 may be associated with the payment amount such that agent 204 merely scans the barcode 618 to determine a purchaser payment due. In such an embodiment, barcode 618 may include a UPC associated with a payment system of agent 204. In some embodiments, multiple barcode maybe provided. For example, as depicted in FIG. 6B, invoice 600 may include multiple barcodes 618a, 618b and 618c. In some embodiments, multiple barcodes may be provided that are indicative of multiple purchaser payments due for multiple items received. For example, barcodes 618a, 618b and 618c may each be associated with three separate purchaser payments for three separate items. In some embodiments, multiple barcodes may be used in combination to assess and determine a purchase payment due, as discussed in more detail below with respect to FIGS. 7A-7C.

In some embodiments, promotional information 620 of invoice 600 includes advertisements, coupons, or various offers. For example, promotional information may include advertisements for vendor 202, for other vendors, websites, businesses, and the like. In some embodiments, the promotional information 620 may be targeted to a purchaser. For example, in one embodiment, promotional information 620 may include a coupon for items similar to those purchased by purchaser 208 in the past. In some embodiments, for instance, promotional material may include discounts for products that are similar to item 209 associated with invoice 600. In some embodiments, promotional information 620 may include a coupon or similar promotional offer relating to merchandise sold by agent 204. For example, where the agent includes a convenience store, invoice 600 may include a coupon for an item sold in the convenience store. In the illustrated embodiment, for instance, promotional information 620 includes a coupon for a "Buy one soda, get on FREE!!!!" offer that is redeemable at a brick-and-mortar location of agent 204. Accordingly, in addition to making a purchaser payment, purchaser 208 may be enticed to make purchase items at the agent location (e.g., at the convenience store operated by agent 204). In some embodiments, similar promotional material may be directed to other agents, merchants, vendors, and the like. For example, a promotion may include receiving a second electronically transmittable item from vendor 202 for free after providing a purchaser payment for the first electronically transmittable item from vendor 202.

In some embodiments, validity of the promotion information 620 may be conditioned on various parameters of the purchaser payment. Promotions may be conditioned on the receipt of a purchaser payment, the amount of a purchaser payment, which agent the purchaser payment is provided to, the timeliness of the purchaser payment, and the like. For example, a promotion may be valid only if a timely purchaser payment of a sufficient amount is made to agent 614 listed on invoice 600. Such promotions may induce purchaser payments, while also increasing customer traffic and purchases at brick-and-mortar locations of agents. Accordingly, purchaser 208 may be more likely to provide the purchase payment in an attempt to receive the promotion. In some embodiments, the promotion may depend upon the quality of the purchase payment. For example, a first—higher value—promotion may be provided for timely payments and/or higher purchase payment amounts, and a second—lesser value—promotion may be provided for un-timely payments and/or lower purchase payment amounts. Accordingly, purchaser 208 may be more likely to provide larger purchase payments in a timely manner.

In certain embodiments, payment system 200 may employ existing systems available to an agent to facilitate a transaction. In some embodiments, system 200 may employ an indicia for identifying and tracking various aspects of a transaction. For example, payment system 200 may employ a bar code symbology, such as universal product codes (UPC's), typically used to track items/merchandise in a retail store. In some embodiments, payment system 200 may associate a purchaser payment amount with a UPC, such that purchaser can present one or more UPC's to an agent (e.g., a UPC 618 printed on invoice 600), the agent can scan/enter the UPC information to assess and determine an amount due, and request the associated purchaser payment from the purchaser.

Some embodiments may employ Point-of-Sale (POS) terminal and Universal Price Codes (UPC). A UPC may contain two fields: a manufacturer code (e.g., XYZ Co.) and a product code (e.g., Can of Soup). The clerk may scan the UPC barcode and the POS terminal may utilize the associated product number to determine the price and product description. POS terminals may or may not be connected to a central computer. The database may be relatively static, for instance, product #1000 from manufacturer #2000 is a can of soup and its price is $2.29. The POS terminal may generate periodic sales reports detailing how many of each product are sold per reporting period. In addition to the actual sales quantities, a POS terminal may also report time of sale, which clerk is on duty, store location/identification (in a retailer with multiple outlets), and other data.

In some embodiments, a UPC code is associated with a manufacturer field assigned to the payment system 200. The product codes for that manufacturer's code are assigned to specific payment amounts (e.g., $5, $10, $20, $30, and so forth). In some embodiments, there a plurality of product codes is assigned to each price point. Accordingly, any one purchaser may generate an invoice for $10 and one of the product codes for that price point may be assigned to that purchase. The purchaser may also be provided a list of retailer locations located in their local and the purchaser may choose one or more specific locations at which to redeem the invoice. After the purchaser visits and pays for the invoice at a chosen retail location, the sales report for that store may reflect the purchase of one unit of the $10 product for the manufacturer code assigned to the payment system 200.

In some embodiments, payment system 200 processes the sales report for that sales period, reconciles the sale of that one unit of the $10 price point to the invoice issued to that purchaser, and credits the associated purchaser's account. If a second purchaser also created an invoice for $10 and also chose the same retailer locations, their invoice may be assigned a different product code for that same price point. Assuming the second purchaser visited the same store, the sales report may show both units, but since they have different product codes, the correct accounts can be credited.

Resources, including product codes, may be finite, and thus may include consideration for how they are assigned/distributed. In a determination of how to assign product codes may include any number of factors. For example, product codes may be assigned based on: the density of retailer outlets, the volume of purchases made via the system, the capacity of the POS terminals database to hold UPC information (few can hold the maximum 10,000 units from one manufacturer), and/or the range of prices points.

In some embodiments, system 200 may assess/determine a person's physical location any number of ways. For example, a person's location may be assessed/determined by simply asking for an address or zip code and/or using an IP-geocoding service. An IP-geocoding service may enable system 200 to determine geographical and other information about their Internet visitors in real-time, such as longitude/latitude, connection speed, ISP, company name, domain name, and/or whether the IP address is an anonymous proxy or satellite provider. From the information obtained, a list of neighborhood stores may be provided the user. In some embodiments, the user must choose only one store to frequent and that code is assigned to that purchaser for that store (e.g., to maximize the availability of codes the purchaser). In some embodiments, the user may be able to select two or more stores. In some embodiments, system 200 can assign a code to that purchaser for any of a given geographical area's stores. In such embodiments, the overall availability of codes may be more limited as any one code may be reserved for multiple retailer locations at a time.

In some embodiment in which the purchaser must choose a single store for redemption, the ultimate sales report may reflect a sale of a unit at a different store than expected. In one embodiment, for instance a code is expected at store A, but shows up at store B where that code wasn't expected. In some embodiments, system 200 may determine this variance and properly credit the purchaser's account. In some embodiments, such as those where the transaction volume is high and that code is assigned to two different stores for two different purchasers and the purchaser makes the same mistake, a conflict may result. For example, store A will have no sales of the particular item and store B will have two where it expected only one. In such embodiments, the system may credit both customers, but the one redeemed at the wrong store may be flagged as suspect, as the second customer could have paid their invoice twice accidentally. When a customer makes an inquiry, there may be enough information to reconcile this and correctly assess the situation. For example, where the sales report also contains time of purchase, store identifier, etc., discrepancies can be managed manually (e.g., if the purchaser saves the POS terminal receipt because identical information may be printed on the receipt as appears in the report).

Adding an expiration date to the invoice may help to make management of the UPC codes more deterministic. For example, if the user could redeem the invoice at any time in the future, the accounting may be difficult as a code could be recycled only after it is redeemed. Even then, a user may pay one day and then accidentally pay the same invoice another day. In some embodiments, using probability and an expiration date may provide a way for the system to effectively manage this situation. As time passes, it is expected that the likelihood of a late redemption may quickly approaches zero. For example, after a few weeks, one may assume the invoice is lost. In some embodiments, the invoice may be marked as redeemable for a given period, say one week, but may not be recycled until four weeks have pass. This additional time may act as a buffer which allows late or double payments to still be credited correctly.

In some embodiments, the receipt may be used as an early payment confirmation. For example, a product description printed on the receipt (e.g., "Spearmint Gum") may includes a confirmation indicia (e.g., word or number) that the purchaser could provide to system 200 (e.g., immediately after payment) and receive associated credit before the actual sales report from the retailer is received/processed by system 200. This may be of particular use with honor payment techniques, such as those described above.

In some embodiments, price points and availability code may be limited to a fixed/finite number. In some embodiments, multiple codes may be used in combination to provide many price points. For example, an increased number of available codes may be obtained additively and the transaction volume can be increased using a technique, such as "spread spectrum" analog. In some embodiments, for instance, a base ten may be employed, although other bases may be employed. For example, the price points may be integral multiples of the base units (e.g. $1, $2, $3, $4, . . . $9, $10, $20, $30 . . . $90, and so forth). Thus in some embodiments any even dollar amount less than $1000 may be represented by a units code, a tens code, and a hundreds code. For example, an assignment to a particular purchase for $213 may include one of a plurality of codes for $200, one of a plurality of codes for $10 and one of a plurality of codes for $3. In some embodiments, system 200 may record the particular combination of codes for a given purchaser's $213 transaction. Another purchaser's $73 transaction may use exactly the same code for the $3 unit, but that paired with the $70 code uniquely identifies that purchaser from the $213 transaction that includes a pairing with $200. In some embodiments, where the overall transaction values are not identical, the combinations of codes may be managed to permit a higher volume of transactions using the same fixed set of codes.

In some embodiments, a retail merchant may operate in accordance with a system that accesses a limited number of UPC's. For example, in some instances, a store may employ a twelve-digit UPC such that there are a finite number of unique digit combinations. The finite number of UPC may be provided in a UPC set. Typically, each product available for purchase in a store may be assigned to one of these unique UPC combinations of the UPC set. For example, a particular soft-drink product may be assigned a unique UPC identifier, such that each of the particular soft-drink products available for purchase in the store is labeled with the same unique UPC identifier.

In some embodiments of the present technique, one or more UPC's of the UPC set may be associated with a monetary value used to assess and determine an amount of a purchaser payment due. For example, a single UPC on an invoice may be indicative of a monetary value of $17. Accordingly, when the UPC is scanned, it may be determined that a purchaser payment of $17 is due. In some embodiments, a plurality of UPC's may be included that are indicative of a purchaser payment due. For example, three UPC's may be included on an invoice, indicative of monetary values of $10, $5, and $2 respectively, wherein the combination of UPC's may be indicative of the purchaser payment due. For example, the associated monetary values may be added together to indicate an associated purchaser payment of $17 is due. In certain embodiments, a limited number of UPC's may be provided in various combinations to provide a large number of purchaser payments due. For example, three UPC's associated with monetary amounts of $10, $5 and $2 may be taken individually or in combination to provide monetary values of at least $2, $5, $7, $10, $12, $15 and $17. Moreover, in some embodiments, the one or more of the three UPC's may be repeated to provide an even larger number of associated monetary values. For example, four UPC's may be provided associated with values of $2, $2, $5, and $10, respectively, to provide a combined total of $19. In one such embodiment, the same UPC may be used for both of the UPC's associated with $2 such that only three unique UPC identifiers are needed to provide the value of $19.

In some embodiments a POS terminal may be connected to a central computing system and can be remotely programmed. For example, larger retailers can manage the UPC catalog of the POS terminal remotely so the individual stores do not have to manage the database. It is expectant that retailers may be able to accomplish this frequently and effortlessly via a computer-to-computer environment. In some embodiments, system 200 can change the product descriptions after a UPC is assigned and/or consumed. For example, if the product description is a confirmation number, that confirmation number may be changed in all POS terminals immediately after redemption. Note the actual product code of the UPC may not change, just its description may change. This may enable more rapid recycling of the UPC codes, but may require that the user enter the confirmation number to realize the credit.

Figure 7A:
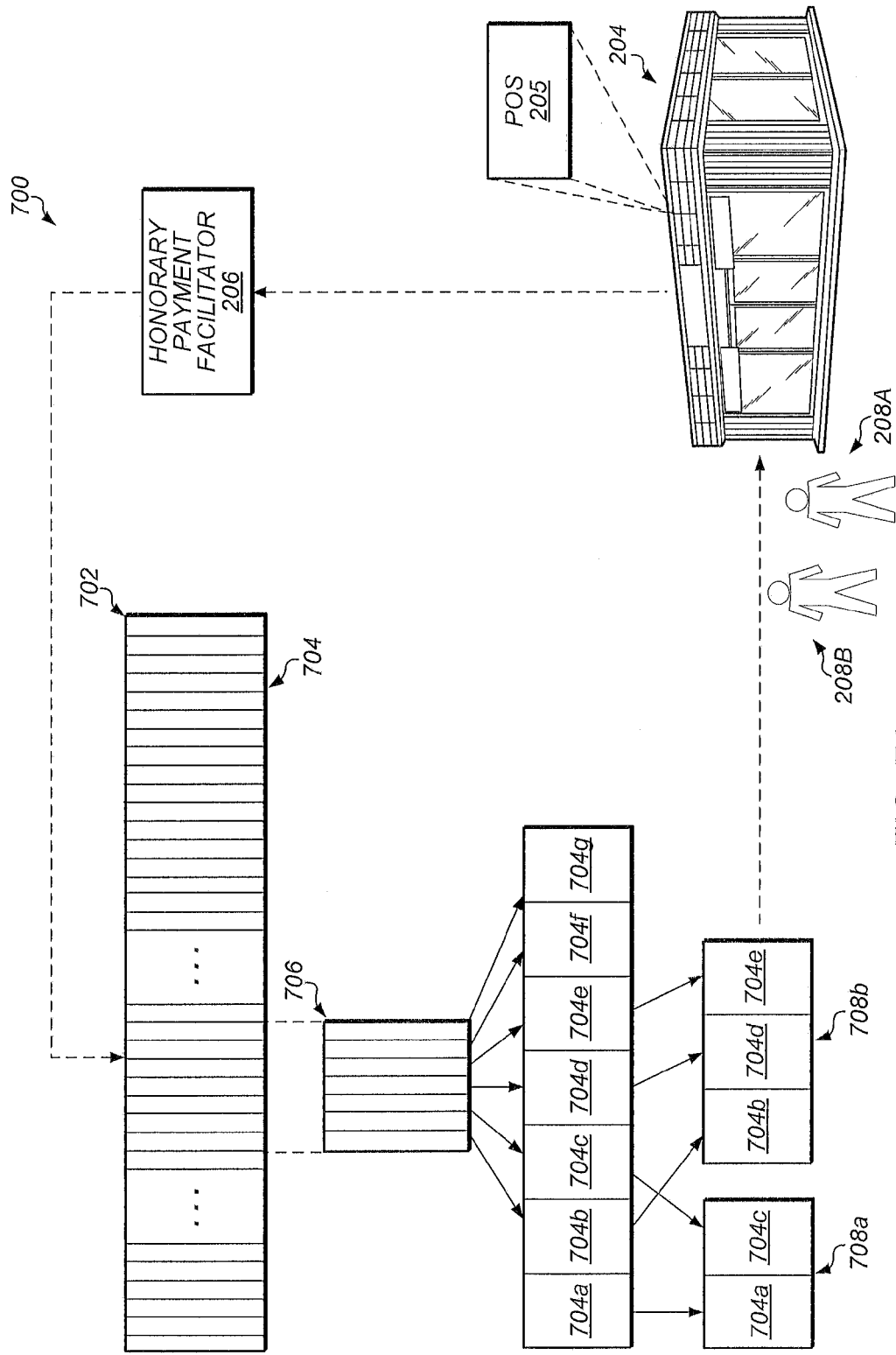
FIG. 7A is a diagram that illustrates a payment tracking system in accordance with one or more embodiments of the present technique.

FIG. 7A is a diagram that illustrates a payment tracking system 700 in accordance with one or more embodiments of the present technique. In some embodiments, payment tracking system 700 may include a system used to identify one or more products available for purchase at a store, and/or payment amounts to be made at the store. In some embodiments, payment tracking system 700 is employed by an agent at a location for receipt of purchaser payments. For example, payment tracking system 700 may be used at a brick-and-mortar retail location of agent 204 for tracking traditional item purchases as well as purchaser payments at the retail location. In the illustrated embodiment, agent 204 includes a Point of Sale (POS) terminal/database 205. Agent 204 may be frequented by purchasers/customers, such as purchasers/customers 208A and 208B illustrated.

In the illustrated embodiment, payment tracking system 700 includes a set of product identifiers (product identifiers set) 702. For example, product identifier set 702 may include a set of UPC's. In some embodiments, product identifiers set 702 includes a finite number of unique identifiers, represented by block 704. For example, each product identifier 704 may include a unique UPC of a set of UPC's. In some embodiments, each of the product identifiers maybe associated with a product or monetary value. For example, each product identifier may include a UPC associated with a particular product available for purchase at an agent's store and/or a monetary value (e.g., $10, $5 and $2).

In the illustrated embodiment, product identifier set 702 includes a product identifier subset 706. In some embodiments, product identifier subset 706 includes one or more of unique product identifiers 704. For example, in the illustrated embodiment, product identifier subset 706 includes a set of eight consecutive unique identifiers 704a, 704b, 704c, 704d, 704e, 704f and 704g. In some embodiments, subset 706 may include any combination of the unique identifiers 704, as does not require that they be consecutive. In some embodiments, each unique product identifier 704a-704g of product identifier subset 706 may be associated with a monetary value. In certain embodiments, during use, one or more of product identifiers 704a-704g may be combined to provide a single monetary value. For example, in the illustrated embodiment, product identifiers 704a may be associated with a monetary value of $1, product identifiers 704b may be associated with a monetary value of $2, product identifiers 704c may be associated with a monetary value of $3, product identifiers 704d may be associated with a monetary value of $5, product identifiers 704e may be associated with a monetary value of $10, product identifiers 704f may be associated with a monetary value of $15, and product identifiers 704g may be associated with a monetary value of $20. Accordingly, 704a and 704c may be combined to provide a product identifier set 708a having a combined monetary value of $4 (e.g., monetary value $1 of 704a added to monetary value $3 of 704c). Similarly, 704b, 704d and 704e may be combined to provide a product identifier set 708b having a combined monetary value of $17 (e.g., the sums of monetary value $2 of 704b, monetary value $5 of 704d, and monetary value $10 of 704e). In In some embodiments, product identifier sets including one or more unique identifiers may be provided to an agent to facilitate purchaser payments. For example, purchaser 208 may receive invoice 600 (discussed previously with respect to FIG. 6B) for $17 including the product identifier set 708b printed thereon. Product identifier set 708b may be provided as one or more UPC's as illustrated by barcodes 618a, 618b and 618c of invoice 600. In some embodiments, the invoice including UPC barcodes may be provided to agent, and agent 204 may read/scan product identifier set 708b to assess and determine a purchaser payment amount due (e.g., $17.00) from the purchaser or someone acting on their behalf. Accordingly, agent 204 may request a purchaser payment for the amount due based on assessment of the combination of one or more UPC's provided on invoice 600.

Agent 204 may provide information associated with the purchaser payment to honorary payment facilitator 206. For example, where agent 204 receives an invoice including product identifier set 708b and an associated purchaser payment, agent 204 may report the purchaser payment and/or information indicative of the receipt of product identifier set 708b to honorary payment facilitator 206 and/or vendor 202. The information may include information contained on the invoice and/or information indicating a time and date of the purchaser payment.

In some embodiments, barcode identifiers issued on an invoice (e.g., UPC's 704b 704d, and 704e) may be provided in circulation and used in subsequent transactions without being withdrawn from circulation. In some embodiments, however, product identifiers may be withdrawn from circulation during certain periods of use. For example, once provided on invoice 600 for the purchase of an item, product identifiers 704b, 704d and 704e may be withdrawn from circulation such that they can not be included on another invoice for a given period of time. In some embodiments, the withdrawal of the product identifiers may include withdrawing them from circulation for a fixed period of time, until the product identifiers are received at an agent location via an invoice, or for a fixed period of time after the product identifiers are received at an agent location via an invoice. This may help to ensure that no two concurrently active invoices include the same product identifiers and/or the same combination of product identifiers, and may enable honorary payment facilitator 206 to associate purchaser payments to a specific purchaser. For example, because a given UPC is only issued to a single active invoice 600, when a purchaser payment is made using the invoice 600 prior to its expiration, payment system 200 can properly credit purchaser 208 or 606 associated with invoice 600.

Figure 7B:
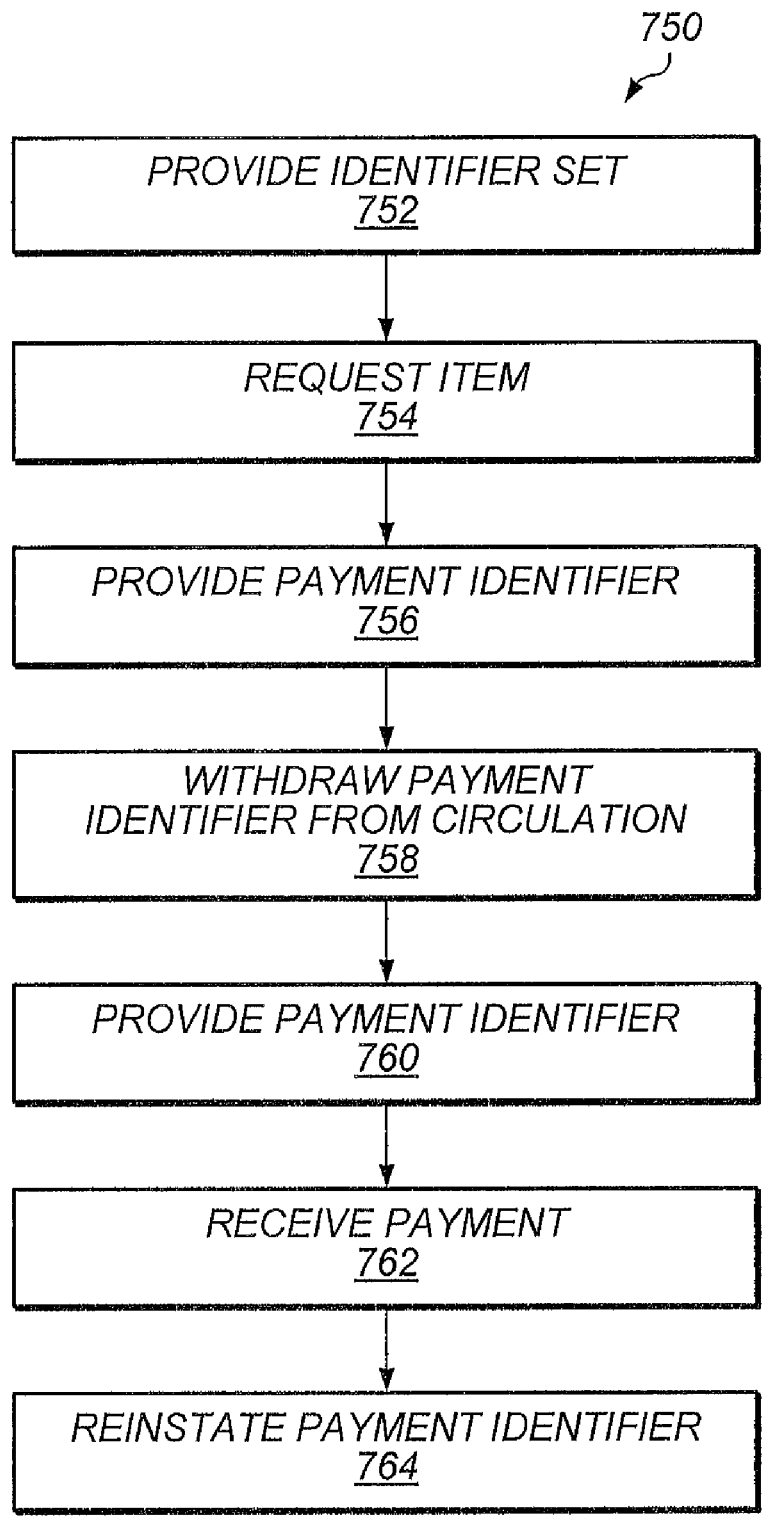
FIG. 7B is a flowchart that illustrates a method of tracking a payments in accordance with one or more embodiments of the present technique.

FIG. 7B is a flowchart that illustrates a method 750 of tracking a payment in accordance with one or more embodiments of the present technique. In the illustrated embodiment, method 750 includes providing an identifier set, as depicted at block 752. In some embodiments, providing an identifier set includes providing product identifiers set 702 including a finite number of unique identifiers 704. For example, providing an identifier set may include providing tracking system 700 including a set of UPC's used to track purchases at a brick-and-mortar location of agents 204.

In the illustrated embodiment, method 750 includes requesting an item, as depicted at block 754. In some embodiments, requesting an item may include purchaser 208 requesting to receive an electronically transmittable item from vendor as described above with respect to block 302 of FIG. 3. For example, purchaser 208 may request to receive item 209 having a price of $17 using honorary credit.

In the illustrated embodiment, method 750 includes providing a payment identifier, as depicted at block 756. Providing a payment identifier may include providing to a purchaser one or more product identifiers 704. In some embodiments, one or more payment identifiers may be provided on an invoice, such as that described with respect to block 310 of FIG. 3, and/or FIGS. 6A and 6B. For example, providing payment identifiers may include providing invoice 600 including a combination of one or more UPC's indicative of a purchaser payment amount equal to a price associated with item 209.

In the illustrated embodiment, method 750 includes withdrawing payment identifiers from circulation, as depicted at block 758. Withdrawing payment identifiers from circulation may include preventing payment identifiers provided at bock 756 from being provided in association with another transaction. For example, payment identifiers that are provided on invoice 600 for a transaction may not be provided on an invoice for another transaction while the payment identifiers are withdrawn. Such embodiments may help to ensure that each product identifier is associated with only one transaction, such that any payment made using the product identifier may be associated with the transaction. In some embodiments, each of the individual product identifiers provided may be withdrawn from circulation. For example, where an invoice is issued with the product identifier set 708b, each of product identifiers 704b, 704d and 704e may not be issued on another invoice while they are withdrawn. In some embodiments, the combination of product identifiers provided may be withdrawn from circulation. For example, where an invoice is issued with the product identifier set 708b, each of 704b, 704d and 704e may not be issued in the same combination on another invoice while they are withdrawn, however, 704b, 704d and 704e may be issued in another combination on another invoice even while the combination of product identifiers 704b, 704d and 704e is withdrawn. For example, invoice 600 having UPC's 618a and 618b associated with a product identifier set including product identifiers 704b and 704d may be issued while the combination of product identifiers 704b, 704d and 704e of product identifier set 708b are withdrawn. In some embodiments, product identifiers and/or the combination of product identifiers may be withdrawn with respect to a particular store. For example, where purchaser 208 selects to provide purchaser payment to one or more locations of agents 204, product identifiers 704b, 704d and 704e individually or in combination, may be removed from circulation with respect to the one or more locations of agents 204. Thus, product identifiers 704b, 704d and 704e individually or in combination, may remain in circulation for use at stores other than those selected or otherwise expected to be used by purchaser 208.

In some embodiments, product identifiers are withdrawn at the time they are provided in association with a transaction. For example, one or more of product identifiers 704b, 704d and 704e of product identifier set 708b may be withdrawn from circulation at the time they are issued on an invoice associated with a transaction.

In some embodiments, the product identifiers associated with a transaction are withdrawn for a fixed period of time. A fixed period of time may include a duration considered sufficient for a purchaser to provide the invoice and/or an associated payment (e.g., purchaser payment to an agent). After the fixed period of time, the product identifiers may be reinstated for use such that they may be provided in association with another transaction. For example, in some embodiments, one or more of product identifiers 704b, 704d and 704e of product identifier set 708b may be withdrawn for a period of thirty days following being issued on an invoice. In such an embodiment, after the thirty day period, the product identifiers 704b, 704d and 704e of product identifier set 708b may be reinstated for use in product identifier set 702 and/or product identifier subset 706 such that they may be included individually or in combination on another invoice.

In some embodiments, the product identifiers associated with a transaction are withdrawn for a fixed period of time after a receipt of a payment (e.g., a purchaser payment) associated with the invoice. For example, the product identifiers associated with a transaction may be withdrawn until a fixed period of time passes after receiving a purchaser payment. Upon expiration of the fixed period of time after the purchaser payment, the product identifiers may be reinstated for use such that they may be provided in association with another transaction. For example, in some embodiments, one or more of product identifiers 704b, 704d and 704e of product identifier set 708b may be withdrawn for the time of the transaction for fixed period of seven days after receiving payment. At that time, the product identifiers 704b, 704d and 704e of product identifier set 708b may be reinstated for use in product identifier set 702 and/or product identifier subset 706.

In some embodiments, an invoice may include an expiration date associated with the period during which the product identifiers are withdrawn. For example, an invoice may include a payment date that is indicative of date by which payment should be received. For example, payment date 616 of invoice 600 described with respect to FIG. 6A, may be indicative of an expiration date of invoice 600 such that an agent may be aware that invoice 600 is expired and should no longer be used in association with a purchaser payment. The payment date may fall within the period the product identifiers are withdrawn. An agent may be instructed not to accept payment after the payment date (e.g., in association with an expired invoice). This may help to ensure that two invoices including the withdrawn product identifiers are not active at the same time, thereby preventing a purchaser payment made using one of the two invoices from being credited to a transaction associated with the other invoice.

In the illustrated embodiment, method 750 includes providing payment product identifiers, as depicted at block 760. Providing payment identifiers may include providing one or more identifiers via electronic transmission (e.g., download or e-mail). For example, purchaser 208 may be provided invoice 600 including product identifiers 618a-618c associated with product identifiers 704b, 704d and 704e of product identifier set 708b via download or e-mail.

In the illustrated embodiment, method 750 includes receiving payment, as depicted at block 762. Receiving payment may include receiving a purchaser payment based on the payment identifiers provided at block 760. For example, a purchaser payment may be provided to agent 204 as described above with respect to block 312 of FIG. 3. In one embodiment, purchaser 208 may provided invoice 600 including product identifier set 708b, agent 204 may assess and determine an amount of the purchaser payment due based on the product identifiers set 708b, and purchaser 208 may provide the appropriate purchaser payment to agent 204.

In the illustrated embodiment, method 750 may include reinstating payment identifiers, as depicted at block 764. Reinstating payment identifiers may include making the previously withdrawn payment identifiers available for use. In some embodiments, reinstating payment identifiers includes reinstating the payment identifiers after the duration of the withdrawal period. For example, after an invoice 600 including payment identifier set 708 is received at agent 204, honorary payment facilitator 206 may wait for the appropriate duration before providing an indication to reinstate the payment identifiers for product identifier set 708. In one embodiment, honorary payment facilitator 206 may proactively notify vendor 202 that product identifiers 704b, 704d and 704e of product identifier set 708b can be reinstated for circulation, and thus may be included on subsequently issued invoices. Such a process may continue with product identifiers continually being issued, withdrawn, reinstated, reissued, and so forth. In some embodiments, honorary payment facilitator 206 may track purchases and refrain from allowing payment system 200 (e.g., vendor 202) to issue the withdrawn UPC's or combination of UPC's. In other words, withdrawal may simply include payment system 200 from issuing the withdrawn product identifiers and/or combination of product identifiers without taking any significant proactive steps to notify the vendors or agents.

Figure 7C:
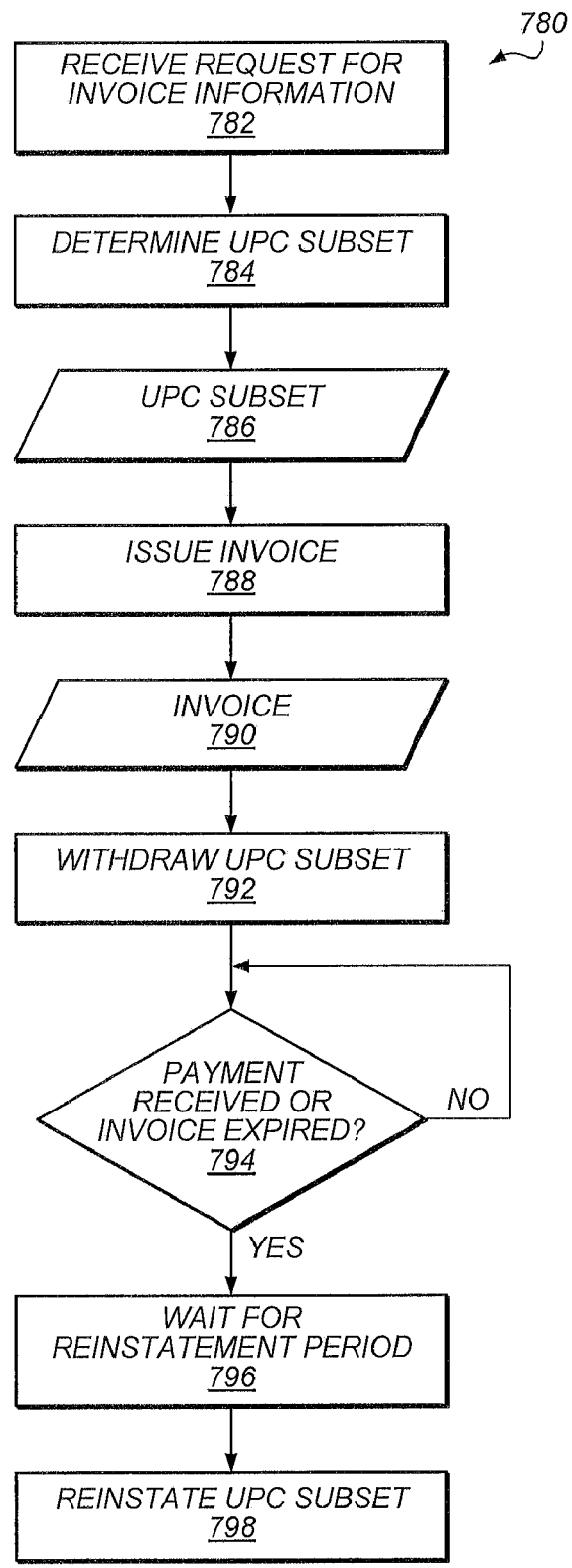
FIG. 7C is a flowchart that illustrates a method of conducting a transaction using payment identifiers in accordance with one or more embodiments of the present technique.

FIG. 7C is a flowchart that illustrates a method 780 of conducting a transaction using payment identifiers in accordance with one or more embodiments of the present technique. In the illustrated embodiment, method 780 includes receiving a request for invoice information, as depicted at block 782. For example, in one embodiment, honorary payment facilitator 206 may receive, from vendor 202, a request to provide invoice information. In some embodiments, invoice information may include one or more bar code identifiers, such as UPC's or other standard identifiers, included on an invoice. In some embodiments, the request may be accompanied by information indicative of the purchase request. For, example vendor 202 may provide information such as a name of the purchaser, a purchase date, a payment amount, one or more agent names, a payment date, or the like.

In the illustrated embodiment, method 780 includes determining a UPC subset 786, as depicted at block 784. Determining a UPC subset may include payment facilitator 206 determining UPC's of product identifier set 708b from UPC's product identifier set 702 and/or product identifier subset 706 to be provided as UPC subset 786 (e.g., included on invoice 600 provided to a purchaser 208). In some embodiments, the UPC subset may be determined based on the information provided from vendor 202. For example, honorary payment facilitator 206 may determine a combination of one or more UPC product identifiers 704 that are indicative of a payment amount provide to an honorary payment facilitator 206.

In some embodiments, method 780 includes issuing an invoice 790, as depicted at block 788. In some embodiments, issuing an invoice includes providing at least a portion of an invoice for distribution to one or more purchasers. For example, issuing the invoice may include providing, to vendor 202, information to be included on invoice 600 to be issued by vendor 202 to purchaser 208. In one embodiment, the information to be included on the invoice may include the UPC subset 786. In some embodiments, issuing the invoice may include providing an invoice to a purchaser. For example, honorary payment facilitator 206 and/or vendor 202 may provide invoice 600 to purchaser 208. In some embodiments, the invoice may include an electronically transmittable invoice that is downloadable by the purchaser or e-mail to the purchaser.

In some embodiments, method 780 includes withdrawing a UPC subset, as depicted at block 792. Withdrawing a UPC subset may include withdrawing UPC subset 786 from circulation such that the respective UPC's (e.g., product identifier of product identifier set 708b from UPC's product identifier set 702 and/or product identifier subset 706) may not be provided individually or in combination for another transaction. In one embodiment, honorary payment facilitator 206 monitors the status of the UPC subset 786 and does not issue an invoice using one or more of the UPC's of UPC subset 786, or their combination, while they are withdrawn. For example, honorary payment facilitator 206 may not allow any of the UPC's of UPC subset 786 to be reissued or may not allow the combination of UPC's of UPC set 786 to be reissued.

In some embodiments, method 780 includes determining whether or not a payment has been received, or an invoice has expired, as depicted at block 794. For example, honorary payment facilitator 206 may assess whether or not a payment has been received in association with the issued invoice 788. In some embodiments, honorary payment facilitator may determine that a payment has been received when invoice 790, including UPC subset 786, is provided to an agent and an associated purchaser payment is provided. For example, if a purchaser payment associated with invoice 600 has been received at agent 204, it may be determined that the UPC's of UPC subset 786 on invoice 600 (e.g., product identifier set 708b or barcodes 618, 618a, 618b, and 618c) are no longer in circulation and the process of reinstating the UPC's may be initiated as discussed in more detail below. If a purchaser payment has not been received, method 780 may include determining whether or not invoice 790 has expired. In one embodiment, invoice 790 may expire after a given period of time has past. For example, invoice 600 may expire thirty days after the date of purchase (e.g., the date of purchaser 208 receiving item 209 and/or receipt of invoice 600). If a purchaser payment has not been received and the invoice has not expired, method 780 may loop thorough step 794, assessing the transaction until it is determined that payment has been received or invoice 790 has expired.

If a purchaser payment has been received and/or the invoice has expired, method 780 may proceed to wait for a reinstatement period, as depicted at block 796, before reinstating the UPC subset at block 798. In some embodiments, waiting for a reinstatement period may include waiting for a fixed period of time after receiving payment and/or expiration of invoice 790. In some embodiments, waiting for reinstatement period 796 may include waiting for a fixed period of time from the time and date of purchase to expire. For example, if UPC subset 798 is to be withdrawn for thirty days following issue of invoice 790, a purchaser payment on day twenty would be followed by an additional ten days of withdrawal and would be reinstated on day thirty.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Furthermore, note that the word "may" is used throughout this application in a permissive sense (i.e., having the potential to, being able to), not a mandatory sense (i.e., must). The term "include", and derivations thereof, mean "including, but not limited to". As used in this specification and the claims, the singular forms "a", "an" and "the" include plural referents unless the content clearly indicates otherwise. Thus, for example, reference to "a syringe" includes a combination of two or more syringes. The term "coupled" means "directly or indirectly connected".

What is claimed is:

1. A method for conducting an honorary credit transaction, comprising:
   providing a system configured to provide honorary credit to a second purchaser in exchange for an honorary commitment to provide payment for electronically transmittable item to one or more agents, wherein the honorary commitment comprises a non-legally binding commitment to provide a payment to the one or more agents for purchase of the electronically transmittable item;
   receiving, via a processor, a request from a first purchaser to provide a second purchaser honorary credit in exchange for an honorary commitment to provide payment for an electronically transmittable item to one or more agents;
   providing, via a processor, the second purchaser honorary credit in exchange for an honorary commitment to provide payment for the electronically transmittable item to one or more agents;

providing the electronically transmittable item to the second purchaser via electronic transmission prior to receiving payment for the electronically transmittable item; and determining that a payment has been received for the electronically transmittable item via at least one of the one or more agents, providing an incentive to the first purchaser based upon said determination.

2. The method of claim 1, wherein providing an incentive comprises providing promotional offerings redeemable for items.

3. The method of claim 1, wherein the items comprise electronically transmittable items available from the vendor providing the electronically transmittable item to the second purchaser.

4. The method of claim 1, wherein providing an incentive comprises providing a monetary payment.

5. The method of claim 1, wherein providing an incentive comprises providing a greater incentives if the payments is of a greater amount and lesser incentive if the payment is of a lesser amount.

6. The method of claim 1, wherein providing an incentive comprises providing a greater incentives if the payments is timely and lesser incentive if the payment is not timely.

7. The method of claim 1, wherein providing an incentive comprises providing an incentive only if the payment is equal to or greater than a threshold value.

8. The method of claim 7, wherein the threshold value is an amount of the payment associated with the honorary commitment.

9. The method of claim 5, wherein providing an incentive comprises providing an incentive only if the payment is equal to or greater than a threshold value.

10. The method of claim 5, wherein providing an incentive comprises improving credit worthiness associated with the first purchaser.

11. The method of claim 5, comprising, if a payment is not received for the electronically transmittable item via at least one of the one or more agents, re-assessing the first purchaser honorary credit score.

12. The method of claim 11, wherein the reassessment comprises reducing credits redeemable for items.

13. The method of claim 11, wherein the reassessment includes imposing a monetary fee.

14. The method of claim 11, wherein the penalty comprises negatively impacting credit worthiness associated with the first purchaser.

15. A system for conducting an honorary credit transaction, comprising:
an honorary payment facilitator configured to:
provide honorary credit to a purchaser in exchange for an honorary commitment to provide payment for electronically transmittable item to one or more agents, wherein the honorary commitment comprises a non-legally binding commitment to provide payment to the one or more agents for purchase of the electronically transmittable item;
receive a request from a first purchaser to provide a second purchaser honorary credit in exchange for an honorary commitment to provide payment for an electronically transmittable item to one or more agents;
provide the second purchaser honorary credit in exchange for an honorary commitment to provide payment for the electronically transmittable item to one or more agents;
provide the electronically transmittable item to the second purchaser via electronic transmission prior to receiving payment for the electronically transmittable item; and
if a payment is received for the electronically transmittable item via at least one of the one or more agents, providing an incentive to the first purchaser.

16. The system of claim 15, comprising a vendor configured to provide the electronically transmittable items to the purchaser.

17. The system of claim 15, comprising the agent configured to accept the payment from the purchaser.

18. The system of claim 15, wherein at least one of the one or more agents comprises an individual, and wherein receiving the payment for the electronically transmittable item via at least one of the one or more agents comprises a purchaser payment being made to the individual by or on behalf of the purchaser.

19. The system of claim 15, wherein at least one of the one or more agents comprises a retail merchant having a brick-and-mortars location, and wherein receiving payment for the electronically transmittable item via at least one of the one or more agents comprises a purchaser payment being made to the retail merchant at the brick-and-mortars location by or on behalf of the purchaser.

20. A method comprising:
providing honorary credit to a first purchaser in exchange for an honorary commitment to provide payment for electronically transmittable item to one or more agents, wherein the honorary commitment comprises a non-legally binding commitment to provide payment to the one or more agents for purchase of the electronically transmittable item;
receiving, via a processor, from a first purchaser, a request to extend honorary credit to a second purchaser;
extending, via a processor, honorary credit to the second purchaser;
conducting, via a processor, a transaction with the second purchaser based on the honorary credit, wherein the transaction comprises providing an electronically transmittable item to the second purchaser via electronic transmission prior to receiving payment for the electronically transmittable item; and
providing an incentive to the first purchaser based upon payment by the second purchaser or imposing a penalty upon the first purchaser based upon non-payment by the second purchaser.

* * * * *